(12) United States Patent
Kimura et al.

(10) Patent No.: US 10,650,036 B2
(45) Date of Patent: May 12, 2020

(54) INFORMATION PROCESSING APPARATUS, INFORMATION PROCESSING SYSTEM, AND INFORMATION PROCESSING METHOD

(71) Applicants: Manabu Kimura, Kanagawa (JP); Hiroyuki Katoh, Kanagawa (JP); Yuusuke Okabe, Kanagawa (JP)

(72) Inventors: Manabu Kimura, Kanagawa (JP); Hiroyuki Katoh, Kanagawa (JP); Yuusuke Okabe, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 161 days.

(21) Appl. No.: 15/697,569

(22) Filed: Sep. 7, 2017

(65) Prior Publication Data

US 2018/0075032 A1    Mar. 15, 2018

(30) Foreign Application Priority Data

Sep. 13, 2016  (JP) .................................. 2016-178688
Jul. 5, 2017  (JP) .................................. 2017-131899

(51) Int. Cl.
 *G06F 15/16*        (2006.01)
 *G06F 16/435*       (2019.01)
 (Continued)

(52) U.S. Cl.
 CPC .......... *G06F 16/435* (2019.01); *G06F 1/3231* (2013.01); *G06F 1/3284* (2013.01);
 (Continued)

(58) Field of Classification Search
 CPC .... G06F 16/435; G06F 17/5054; G06F 21/32; G06F 21/34; G06F 21/608;
 (Continued)

(56) References Cited

U.S. PATENT DOCUMENTS

| | | | | |
|---|---|---|---|---|
| 5,539,530 A | * | 7/1996 | Reifman | H04N 1/00384 358/400 |
| 8,190,129 B2 | * | 5/2012 | Ben Ayed | G06F 21/32 455/410 |

(Continued)

FOREIGN PATENT DOCUMENTS

| | | |
|---|---|---|
| JP | 2005-260830 | 9/2005 |
| JP | 2016-010024 | 1/2016 |

*Primary Examiner* — Chris Parry
*Assistant Examiner* — Dixon F Dabipi
(74) *Attorney, Agent, or Firm* — IPUSA, PLLC

(57) ABSTRACT

An information processing apparatus is provided that includes a memory storing a program and a processor configured to execute the program to implement processes of determining whether an execution request for executing a function of the information processing apparatus has been accepted from a user, acquiring information relating to the execution request upon determining that the execution request has been accepted, generating a screen to be displayed on a display unit based on the acquired information relating to the execution request, executing an authentication process with respect to the user, and controlling the display unit to display the generated screen when the user has been successfully authenticated by the authentication process.

18 Claims, 32 Drawing Sheets

(51) Int. Cl.
*H04L 29/08* (2006.01)
*H04W 4/18* (2009.01)
*G06F 3/14* (2006.01)
*G06F 21/60* (2013.01)
*G06F 21/34* (2013.01)
*G06F 21/32* (2013.01)
*G06F 3/147* (2006.01)
*G06F 1/3234* (2019.01)
*G06F 1/3231* (2019.01)
*G06K 9/00* (2006.01)
*G06F 1/3287* (2019.01)
*G06F 30/34* (2020.01)
*G06F 3/048* (2013.01)

(52) U.S. Cl.
CPC .......... *G06F 1/3287* (2013.01); *G06F 3/1407* (2013.01); *G06F 3/147* (2013.01); *G06F 21/32* (2013.01); *G06F 21/34* (2013.01); *G06F 21/608* (2013.01); *G06F 30/34* (2020.01); *G06K 9/00288* (2013.01); *H04L 67/1036* (2013.01); *H04W 4/18* (2013.01); *G06F 3/048* (2013.01); *G06F 2216/17* (2013.01); *G09G 2354/00* (2013.01); *G09G 2358/00* (2013.01)

(58) Field of Classification Search
CPC .... G06F 2216/17; G06F 3/048; G06F 3/1407; G06F 3/147; G09G 2354/00; G09G 2358/00; H04L 67/1036; H04W 4/18
See application file for complete search history.

(56) References Cited

U.S. PATENT DOCUMENTS

| | | | |
|---|---|---|---|
| 8,447,844 B2 | 5/2013 | Kimura | |
| 2002/0105666 A1* | 8/2002 | Sesek | G06F 21/608 358/1.14 |
| 2004/0258277 A1* | 12/2004 | Ueda | G06F 21/608 382/100 |
| 2008/0256459 A1* | 10/2008 | Sekiya | G06F 21/32 715/741 |
| 2009/0158422 A1* | 6/2009 | Tomiyasu | G06F 21/608 726/17 |
| 2009/0257078 A1* | 10/2009 | Sawada | G06F 21/608 358/1.14 |
| 2010/0002250 A1* | 1/2010 | Sakagami | H04N 1/0035 358/1.14 |
| 2010/0253977 A1* | 10/2010 | Kunori | G03G 15/5066 358/1.15 |
| 2011/0286028 A1* | 11/2011 | Kinouchi | G06F 21/35 358/1.14 |
| 2015/0116756 A1* | 4/2015 | Mori | G06F 3/1204 358/1.14 |
| 2017/0139658 A1 | 5/2017 | Nagata et al. | |

* cited by examiner

FIG.6

| DATA TYPE | DATA 1 | DATA 2 | ... | DATA 300 |
|---|---|---|---|---|
| ADDRESS BOOK NUMBER | 001 | 002 | ... | 300 |
| NAME | A | B | ... | C |
| EMAIL ADDRESS | aaa@bbb.ccc | bbb@bbb.ccc | ... | ccc@bbb.ccc |
| LOGIN ID | A_aaa | B_bbb | ... | C_ccc |
| LOGIN PASSWORD | 12345 | abcdef | ... | vwxyz |
| WIRELESS TAG ID | 00522213 | 00535213 | ... | 05245219 |
| FACE AUTHENTICATION PERSONAL DATA | {222, 241, 52, ..., 40, −167, −58} | {56, 111, −3, ..., −120, 47, 208} | ... | {186, 241, −36, ..., 20, −67, 158} |

FIG.7
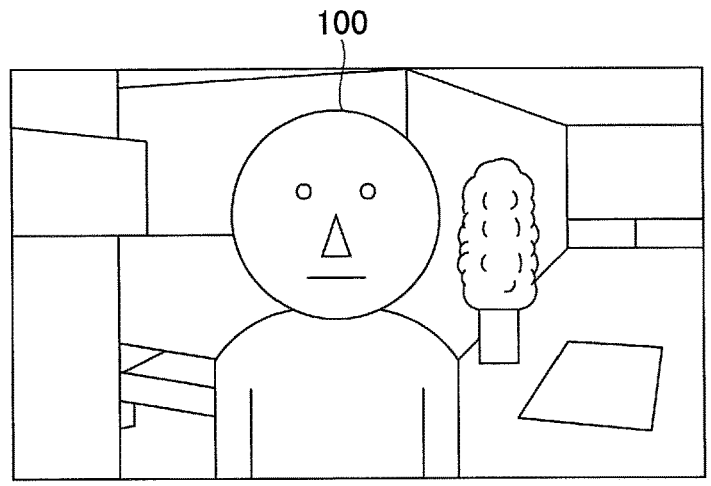
FIG.8
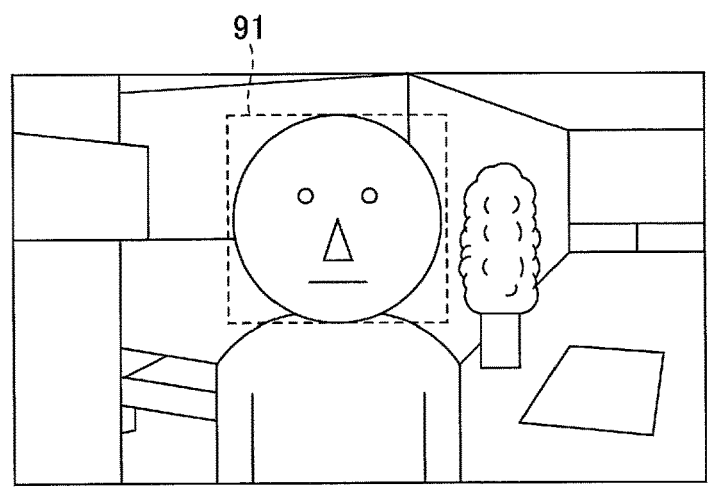
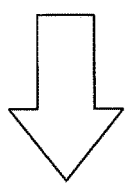
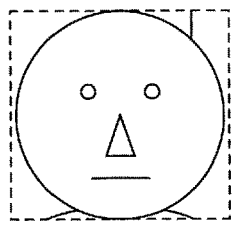

FIG.9

| JOB ID | JOB STATUS | ADDRESS BOOK NUMBER | USER NAME | DOCUMENT NAME | NUMBER OF PAGES | NUMBER OF COPIES |
|---|---|---|---|---|---|---|
| 0001 | PRINTING | 002 | B | DOCUMENT Y | 3 | 1 |
| 0002 | WAITING | 300 | C | DOCUMENT Z | 1 | 1 |
| 0003 | WAITING | 001 | A | DOCUMENT X | 15 | 2 |
| 0004 | WAITING | 001 | A | DOCUMENT W | 1 | 5 |

FIG.21

JOB LIST

| JOB ID | JOB STATUS | USER NAME | DOCUMENT NAME | NUMBER OF PAGES | NUMBER OF COPIES |
|---|---|---|---|---|---|
| 0001 | PRINTING | *** | *** | *** | *** |
| 0002 | WAITING | C | DOCUMENT Y | 1 | 1 |
| 0003 | WAITING | *** | *** | *** | *** |
| 0004 | WAITING | *** | *** | *** | *** |

DELETE

WITHHOLD

REARRANGE

FIG.23

IMAGE AUTHENTICATION WILL BE PERFORMED.

PLEASE MAKE SURE THE CAMERA IS CAPTURING YOUR FACE AND WAIT FOR A WHILE.

FIG.30A

JOB LIST

| JOB ID | JOB STATUS | USER NAME | DOCUMENT NAME | NUMBER OF PAGES | NUMBER OF COPIES |
|---|---|---|---|---|---|
| 0001 | PRINTING | A | DOCUMENT Y | 1 | 1 |
| 0002 | WAITING | A | DOCUMENT Z | 1 | 1 |

DELETE

WITHHOLD

REARRANGE

FIG.30B

JOB LIST

| JOB ID | JOB STATUS | USER NAME | DOCUMENT NAME | NUMBER OF PAGES | NUMBER OF COPIES |
|---|---|---|---|---|---|
| 0001 | PRINTING | A | DOCUMENT Z | 1 | 1 |

DELETE

WITHHOLD

REARRANGE

FIG.30C

JOB LIST

| JOB ID | JOB STATUS | USER NAME | DOCUMENT NAME | NUMBER OF PAGES | NUMBER OF COPIES |
|--------|-----------|-----------|---------------|-----------------|------------------|
| 0001 | PRINTING | A | DOCUMENT Y | 1 | 1 |
| 0002 | WAITING | A | DOCUMENT Z | 1 | 1 |
| 0003 | WAITING | A | DOCUMENT Z | 1 | 2 |

DELETE

WITHHOLD

REARRANGE

FIG.30D

JOB LIST

| JOB ID | JOB STATUS | USER NAME | DOCUMENT NAME | NUMBER OF PAGES | NUMBER OF COPIES |
|---|---|---|---|---|---|

DELETE

WITHHOLD

REARRANGE

INFORMATION PROCESSING APPARATUS, INFORMATION PROCESSING SYSTEM, AND INFORMATION PROCESSING METHOD

CROSS-REFERENCE TO RELATED APPLICATIONS

The present application claims priority under 35 U.S.C. § 119 to Japanese Patent Application No. 2016-178688 filed on Sep. 13, 2016 and Japanese Patent Application No. 2017-131899 filed on Jul. 5, 2017, the entire contents of which are incorporated herein by reference.

BACKGROUND OF THE INVENTION

1. Field of the Invention

The present invention relates to an information processing apparatus, an information processing system, and an information processing method.

2. Description of the Related Art

Authentication methods are known for authenticating a user using an electronic device, such as a printer or an MFP (multifunction peripheral), including image authentication based on a captured image, short-distance wireless authentication using an IC card, and a combination of these authentication methods, for example.

Further, a technique is known for activating a preset screen for a user when the user has been authenticated using such authentication method, or in response to a certain event, such as startup or returning to normal operations from power saving mode (see, e.g., Japanese Unexamined Patent Publication No. 2016-10024).

However, a screen that is desirably displayed immediately after a user is authenticated may vary depending on whether the user has made a function execution request with respect to the electronic device, for example. When a desired screen is not immediately displayed, the user may be unnecessarily burdened by the need to perform additional screen operations, for example.

SUMMARY OF THE INVENTION

One aspect of the present invention is directed to providing an information processing apparatus, an information processing system, and an information processing method that can reduce the waiting time for displaying a screen after a user is authenticated.

According to one embodiment of the present invention, an information processing apparatus is provided that includes a memory storing a program and a processor configured to execute the program to implement processes of determining whether an execution request for executing a function of the information processing apparatus has been accepted from a user, acquiring information relating to the execution request upon determining that the execution request has been accepted, generating a screen to be displayed on a display unit based on the acquired information relating to the execution request, executing an authentication process with respect to the user, and controlling the display unit to display the generated screen when the user has been successfully authenticated by the authentication process.

BRIEF DESCRIPTION OF THE DRAWINGS

FIG. 6 is a diagram illustrating an example of address book data;

FIG. 7 is a diagram illustrating an example image captured by a camera;

FIG. 8 is a diagram illustrating an example face image extracted from the captured image;

FIG. 9 is a diagram illustrating an example of job list information;

FIG. 21 is a diagram illustrating an example job list screen displayed after user login;

FIG. 23 is a diagram illustrating an example screen prompting image authentication;

FIGS. 30A-30D are diagrams illustrating example job list screens.

DESCRIPTION OF THE EMBODIMENTS

In the following, embodiments of the present invention are described with reference to the accompanying drawings.

Figure 1:
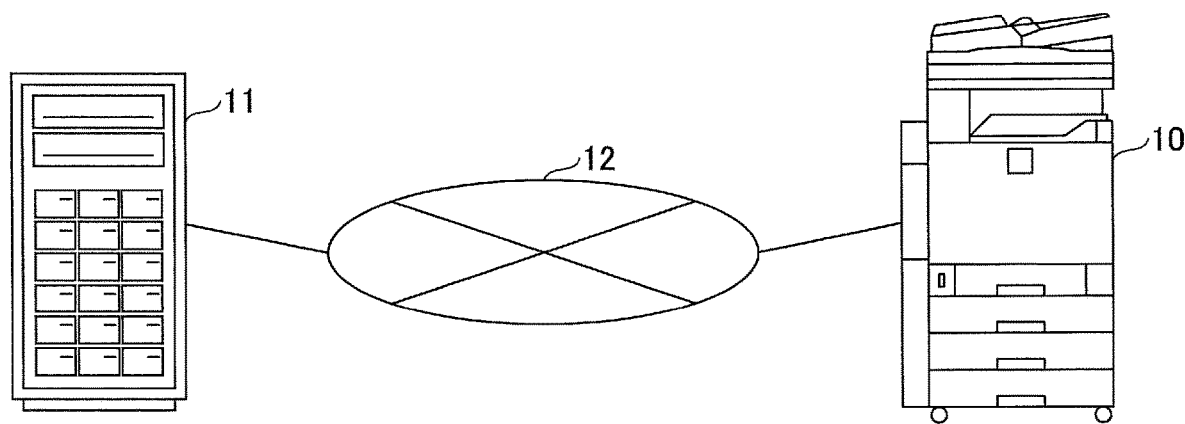
FIG. 1 is a diagram illustrating an example configuration of an information processing system.

FIG. 1 is a diagram illustrating an example configuration of an information processing system. In FIG. 1, the information processing system includes an image processing apparatus 10 as an information processing apparatus and a server 11. Note that the information processing apparatus does not necessarily have to be an image processing apparatus and may be any type of apparatus used by a user that is capable of providing a function or a service to the user. Examples of the image processing apparatus 10 include a printer, a scanner, a facsimile machine, a copier, and an MFP (multifunction peripheral). Examples of an information processing apparatus other than an image processing apparatus include a digital whiteboard, a projector, and the like.

In the following descriptions, the image processing apparatus 10 is assumed to be an MFP and will be referred to as "MFP 10". Note that the configuration of the information processing system illustrated in FIG. 1 is merely an illustrative example, and in some embodiments, the MFP 10 may include a server function and the information processing system may be configured by the MFP 10 alone, for example. Also, the information processing system may additionally include an information processing terminal, such as a PC (personal computer) used by a user, for example.

The MFP 10 and the server 11 are connected to a network 12 and communicate with each other via the network 12. The network 12 may be a wired network or a wireless network, such as a wireless LAN (Local Area Network). Further, the network 12 is not limited to one network, and may be made up of two or more networks connected by a relay device, such as a router or a proxy server, for example.

The server 11 communicates with a PC used by the user, receives a function execution request directed to the MFP 10 as a job, and stores the job until the MFP 10 can execute the job. The MFP 10 has a plurality of functions, such as a printing function, a copying function, a scanner function, a facsimile function, and the like, and executes the jobs stored in the server 11 in the order in which the jobs have been stored. In the following, an example case where the function to be executed by the MFP 10 is a printing function is described.

The user creates a document to be printed using the PC, converts the document into data interpretable by the MFP 10 with a printer driver installed in the PC, and transmits the converted data to the server 11 as a print job. Note that in some embodiments, the printer driver may be installed in the server 11.

The server 11 communicates with the MFP 10, acquires job information of a job being executed by the MFP 10, acquires job information of stored jobs, lists up the job information of all jobs for which execution requests have been issued, and generates job list information.

The MFP 10 accepts user information from a user upon allowing the user to use a function of the MFP 10. Examples of the user information include a user ID, a password, a wireless tag ID identifying an IC card corresponding to a communication device carried by the user, an employee number, biometric information, and the like.

The user may input the user information using an operation panel or hardware keys of the MFP 10, for example. Also, the user may carry an IC card that has the user information recorded therein and cause a wireless communication device included in or connected to the MFP 10 to acquire the user information, for example. Note that the device used to input the user information is not limited to an IC card but may be a mobile phone, a smartphone, or some other communication device, for example.

The IC card may be provided with an RFID (Radio Frequency Identifier) tag, for example. The RFID tag includes an IC chip and an antenna. The IC chip uses the antenna to communicate with a wireless communication device provided in the MFP 10 and transmits the user information stored therein in response to a request from the wireless communication device. Note that the RFID tag may be an active RFID tag, which includes a battery and transmits radio waves with its own power during communication, or a passive RFID tag, which is operated by radio waves received from the wireless communication device and returns a response, for example. Note that a RF tag reader may be used as the wireless communication device, for example.

The MFP 10 performs user authentication using the user information acquired from the IC card or input by the user. When the user is successfully authenticated, the MFP 10 generates and displays a job list screen as a preset screen for the user. For example, a user that undergoes an authentication process to gain access to the MFP 10 after the user has made a print job request will likely want a print job list to be initially displayed by the MFP 10. As such, the MFP 10 generates and displays a job list screen rather than a home screen, for example, so that the user would not have to perform operations for switching the screen. The MFP 10 basically executes jobs in the order in which they are listed in the job list screen. However, the user may rearrange the execution order of the jobs as necessary by deleting a job or putting a job on hold, for example. When executing jobs, the MFP 10 communicates with the server 11 to acquire the relevant jobs that are stored in the server 11.

When the user is not successfully authenticated, the MFP 10 refrains from displaying a job list screen and may instead display an error screen or a user information input screen, for example. Alternatively, if the MFP 10 was in power saving mode and the screen was turned off before the user authentication, the screen may remain turned off, for example.

Note that the authentication method used for authenticating the user is not limited to wireless authentication based on information acquired from an IC card. For example, an image of the face of the user may be captured and image authentication may be performed using the face image including facial feature information. Also, the user authentication method may be a combined authentication combining wireless authentication and image authentication, for example.

The combined authentication is not limited to a combination of the above wireless authentication and image authentication but may be a combination of other authentication methods that use different types of information to perform user authentication. Further, the combination is not limited to a combination of the two authentication methods but may be a combination of three or more authentication methods, for example. Note that authentication reliability (security) may be improved by using more authentication methods and performing authentication based on more types of user information. However, increasing the authentication methods used may lead to higher costs and increased processing time and effort for authentication, for example.

Note that the authentication accuracy of the authentication process based on user information recorded in an IC card is relatively high because the user information recorded in the IC card does not change as a result of physical changes, such as the orientation and/or facial expression of the user, for example. In the following, such user information that can achieve high authentication accuracy upon being used in an authentication process is referred to as first authentication information. The first authentication information is not limited to user information recorded in an IC card, but may be user information that is manually input by the user, for example. An authentication process based on the first authentication information can achieve high authentication accuracy. On the other hand, the first authentication is vulnerable to misuse by a third party. For example, a third party can easily use an IC card storing the first authentication information and be successfully authenticated.

The facial feature information included in a face image of a user may vary depending on the orientation, facial expression, and other physical changes of the user. As such, the authentication accuracy of an authentication process based on facial feature information is lower than the above-described authentication process based on the first authentication information. In the following, biometric information including such facial feature information is referred to as second authentication information. The second authentication information is not limited to the facial feature information but may be other types of biometric information, such as fingerprint information, iris information, vein information, and the like. Although the authentication accuracy of an authentication process based on the second authentication information is comparatively lower than that based on the first authentication information, the second authentication information is less vulnerable to misuse by a third party.

By performing authentication based on the first authentication information that can achieve high authentication accuracy and authentication based on the second authentication information that cannot be easily misused, and allowing use of the MFP 10 only when the same user is identified and authenticated in both of the above two authentication processes, authentication accuracy may be improved while preventing misuse.

By performing authentication using the above two authentication methods, reliable authentication may be achieved without using a large number of authentication methods. In this way, adequately high authentication accuracy may be achieved. Also, by using information recorded in an IC card as authentication information, authentication accuracy may be easily improved by simply having a wireless communication device acquire the information from the IC card, for example.

When attempting to use the MFP 10, the user approaches the MFP 10 and causes the wireless communication device included in or connected to the MFP 10 to automatically acquire information recorded in the IC card carried by the user. Further, the user directs his or her face to a camera installed in or connected to the MFP 10, and causes the camera to capture an image including the face of the user. As a result, the MFP 10 can acquire the first authentication information and a face image including the second authentication information.

The MFP 10 stores the first authentication information and the second authentication information of a plurality of users. The MFP 10 compares the acquired first authentication information and second authentication information of the user that is attempting to use the MFP 10 with the stored first authentication information and second authentication information of the plurality of users. Then, the MFP 10 determines whether there is a match between the acquired first authentication information and the stored first authentication information and a match between the acquired second authentication information of the user and the stored second authentication information. Note that because the second authentication information is biometric information, such as facial feature information, it would be unlikely for the MFP 10 to find an exact match between the acquired second authentication information and the second authentication information stored in the MFP 10. As such, it can be determined that there is a match if second authentication information having sufficient similarity with the acquired second authentication information can be found. Note that the extent of similarity that would be required to determine the existence of a match may be arbitrarily set up by a system administrator, for example.

When there is first authentication information and second authentication information stored in the MFP 10 that that respectively match the acquired first authentication information and second authentication information of the user, the MFP 10 determines that authentication is successful. Then, the MFP 10 determines whether the first authentication information and the second authentication information are associated with the same user. Upon determining that the first authentication information and the second authentication information are associated with the same user, the MFP 10 allows the user to use the MFP 10. Upon allowing use of the MFP 10, the user is logged in and the MFP 10 displays a preset screen to enable execution of a job requested by the user. On the other hand, if it is determined that the first authentication information and the second authentication information are not associated with the same user, the MFP 10 does not allow the user to use the MFP 10.

Also, the MFP 10 does not allow the user to use the MFP 10 in the case where no match can be found for the acquired first authentication information and the acquired second authentication information from the first authentication information and the second authentication information of the plurality of users stored in the MFP 10, in the case where a match cannot be found for one of the acquired first authentication information and the acquired second authentication information, or when the authentication process results in authentication failure, for example.

Note that when no match can be found for one of the acquired first authentication information and the acquired second authentication information of the user, the user may seek confirmation of an approver, such as the user's supervisor, and the approver may authorize use of the MFP 10, for example. The confirmation process involving the approver can be carried out by email. For example, in a case where the wireless tag ID corresponding to the first authentication information matches the first authentication information stored in the MFP 10 but the facial feature information corresponding to the second authentication information does not match any of the second authentication information stored in the MFP 10, an email with an attachment including the face image of the user may be transmitted to the approver so that the approver can check the face image and allow the user to use the MFP 10.

The user carries an IC card and moves toward the installation location of the MFP 10. When the IC card enters a detection range (area) of the MFP 10, the MFP 10 acquires the first authentication information from the IC card and executes an authentication process based on the acquired first authentication information. When authentication is successful in this authentication process, it is determined whether a print job previously submitted by the user exists in the MFP 10 and/or the server 11. If such print job exists, the MFP 10 acquires job information of jobs currently being executed and jobs that are stored and generates a job list screen in order to enable the user to execute the job.

Also, when the user approaches the MFP 10, the MFP 10 captures an image including the face of the user, acquires the facial feature information of from the image as the second authentication information, and executes an authentication process based on the second authentication information. When authentication is successful in this authentication process, the MFP 10 confirms whether the first authentication information and the second authentication information used in these two authentication processes are associated with the same user. Upon confirming that the first authentication information and the second authentication information are associated with the same user, the MFP 10 allows the user to use the MFP 10.

Upon allowing use of the MFP 10, the user is logged in, and the MFP 10 displays the job list screen generated in the above-described manner as a preset screen for the user. When the job list screen is displayed, the user can check the status of one or more jobs the user has previously requested, and delete, put on hold, or change the execution order of the jobs as necessary or desired, for example.

Upon denying (not allowing) use of the MFP 10, for example, the MFP 10 may display a screen prompting the user to input authentication information (user information) again.

Note that the authentication process for authenticating the user may be based on any of the above-described types of authentication information and may be based on three or more types of authentication information, for example. In the descriptions below, combined authentication combining wireless authentication and image authentication using the first authentication information and second authentication information is illustrated as an example.

Figure 2:
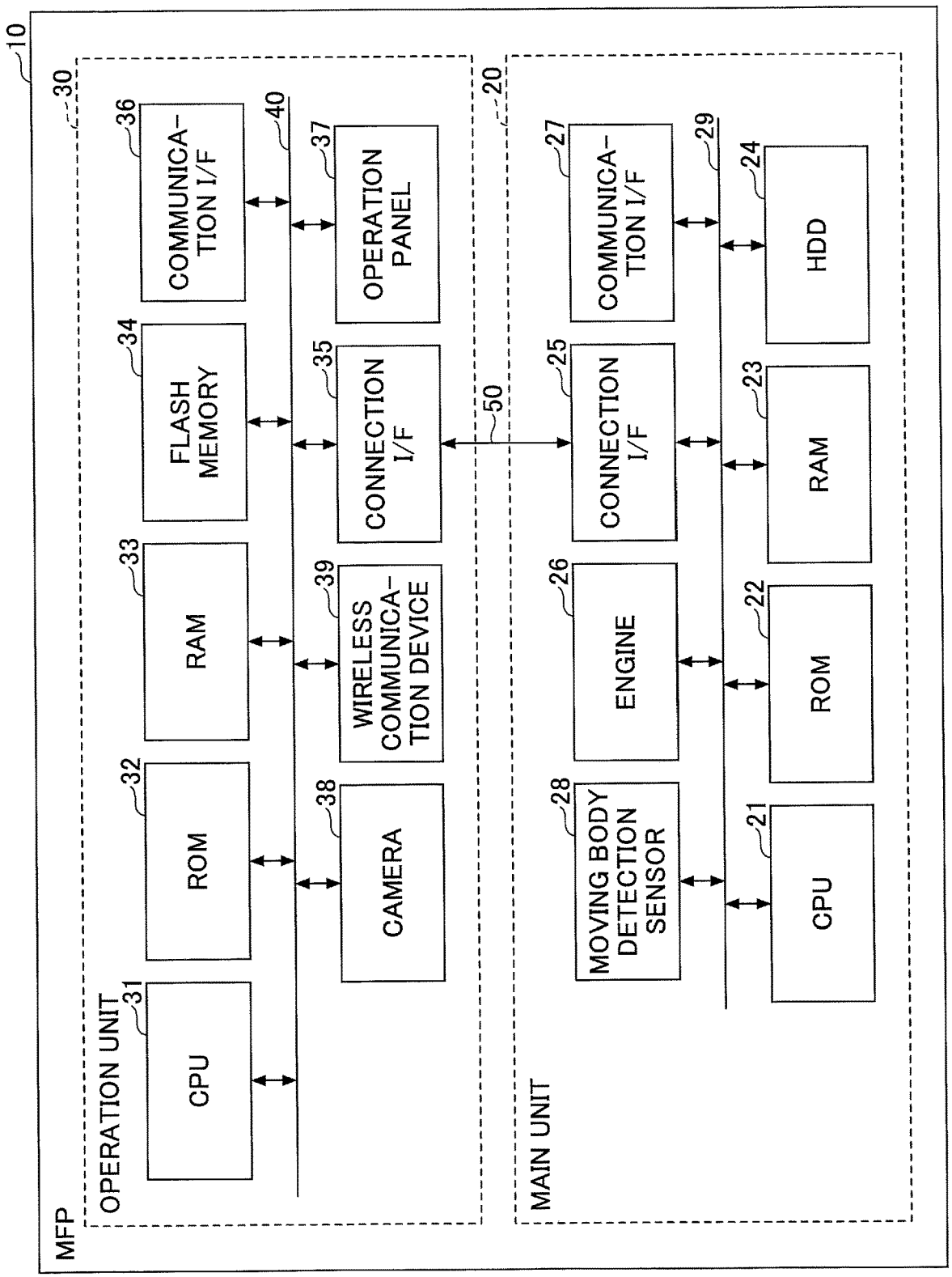
FIG. 2 is a diagram illustrating an example hardware configuration of multifunction peripheral included in the information processing system.

In the following, the hardware configuration of the MFP 10 will be described with reference to FIG. 2. The MFP 10 includes a main unit 20 that implements a plurality of functions such as a copying function, a scanner function, a facsimile function, a printing function, and the like, and an operation unit 30 that accepts a user operation. The main unit 20 and the operation unit 30 are communicably connected to each other via a dedicated communication path 50. The communication path 50 may use any communication standard, such as the Universal Serial Bus (USB) standard, and may be a wired communication path or a wireless communication path.

The operation unit 30 accepts a user operation and sends an operation instruction to the main unit 20. In response, the main unit 20 performs an operation according to the operation instruction from the operation unit 30. Note that accepting an operation includes the concept of accepting information input by an operation of the user. The input information may include a signal indicating a coordinate value of the screen, for example.

The main unit 20 includes a CPU (Central Processing Unit) 21, a ROM (Read Only Memory) 22, a RAM (Random Access Memory) 23, an HDD (Hard Disk Drive) 24, a connection I/F 25, an engine 26, a communication I/F 27, a moving body detection sensor 28, and a system bus 29. The CPU 21 executes programs stored in the ROM 22 and the HDD 24 to control operations of the main unit 20. The ROM 22 is a nonvolatile memory that stores programs, such as a BIOS (Basic Input/Output System) that is executed upon starting the main unit 20, and various setting values, for example. The RAM 23 is a volatile memory that provides a work area that holds a program being executed by the CPU 21, for example.

The HDD 24 is a nonvolatile storage device that stores an OS (Operating System), application programs for implementing various functions, and various data. By executing an application program stored in the HDD 24, the CPU 21 implements various functions, such as a printer function, a scanner function, a facsimile function, a copy function, and the like. Note that although the HDD 24 is used in the present example, some other type of storage device, such an SSD (Solid State Drive), may be used instead of the HDD 24, for example.

The connection I/F 25 is an interface for communicating with the operation unit 30 via the communication path 50. The engine 26 is hardware for executing processes other than information processing and communication to implement the above-described functions of the MFP 10. For example, the engine 26 may include hardware, such as a scanner for scanning a document, a plotter for printing an image on a recording medium such as paper, and a fax unit for executing facsimile transmission/reception. In addition, the engine 26 may include specific optional hardware, such as an automatic document feeder (ADF) for automatically feeding a document, a finisher for sorting printed paper, and the like.

The communication I/F 27 is a network interface for connecting the main unit 20 to the network 12 and communicating with an external device connected to the network 12. The external device may be a PC or some other type of device connected to the network 12, and the communication I/F 27 can receive a print request from the external device, for example.

The moving body detection sensor 28 is a sensor that detects a moving body within a detection range in the vicinity of the MFP 10. The moving body that can be detected by the moving body detection sensor 29 may include a human, for example. The moving body detection sensor 28 may be a pyroelectric sensor for detecting a human, for example. The pyroelectric sensor is an infrared sensor that detects a temperature change and is used as a human sensor. The system bus 29 is connected to the above-described units of the main unit 20, such as the CPU 21 and the ROM 22, and transmits address signals, data signals, and various control signals.

Note that the main unit 20 may also include an external connection I/F, for example. The external connection I/F is an interface for establishing connection with an external device, such as an IC card reader that reads the first authentication information from an IC card, a keyboard that accepts a key input made by a user, and the like. Note that the external connection I/F may be provided in both the main unit 20 and the operation unit 30, or the external connection I/F may only be provided in either the main unit 20 or the operation 30, for example.

The operation unit 30 includes a CPU 31, a ROM 32, a RAM 33, a flash memory 34, a connection I/F 35, a communication I/F 36, an operation panel 37, a camera 38, a wireless communication device 39, and a system bus 40. The CPU 31 executes programs stored in the ROM 32 and the flash memory 34 to control operations of the operation unit 30. The ROM 32 is a nonvolatile memory that stores programs, such as a BIOS that is executed upon starting the operation unit 30, and various setting values. The RAM 33 is a volatile memory that provides a work area for holding a program being executed by the CPU 31.

The flash memory 34 is a nonvolatile storage device that stores an OS, application programs, and various data, for example. By executing an application program stored in the flash memory 34, the CPU 31 implements various functions, such as displaying information (image) according to an input accepted from the user. The connection I/F 35 is an interface for communicating with the main unit 20 via the communication path 50. The communication I/F 36 is a network interface for connecting the operation unit 30 to the network 12 and communicating with an external device connected to the network 12.

The operation panel 37 accepts various inputs according to an operation made by the user and displays various types of information. The various types of information may include information according to an operation accepted from a user, information indicating the operation status of the MFP 10, information on various setting values, and information on a preset screen to be displayed after login, for example. The operation panel 37 may be a liquid crystal display (LCD) or an organic EL (Electro Luminescence) display that is provided with a touch panel function, for example. However, the operation panel 37 is not limited to a display having the touch panel function, and in some embodiments, hardware keys may be provided separately from the display.

The camera 38 is an image capturing device that captures an image within an image capturing range. The wireless communication device 39 is used to establish communication with a communication device, such as an IC card, within a predetermined communication range of several centimeters to several meters through short range wireless communication.

The system bus 40 is connected to the above-described units of the operation unit 30, such as the CPU 31 and the ROM 32, and transmits address signals, data signals, and various control signals. As described above, the operation unit 30 may also be provided with an external connection I/F, for example.

The communication path 50 is used not only for establishing communication between the main unit 20 and the operation unit 30 but also for power supply from the main unit 20 to the operation unit 30. Thus, the MFP 10 can execute dedicated power control of the operation unit 30, for example.

Figure 3:
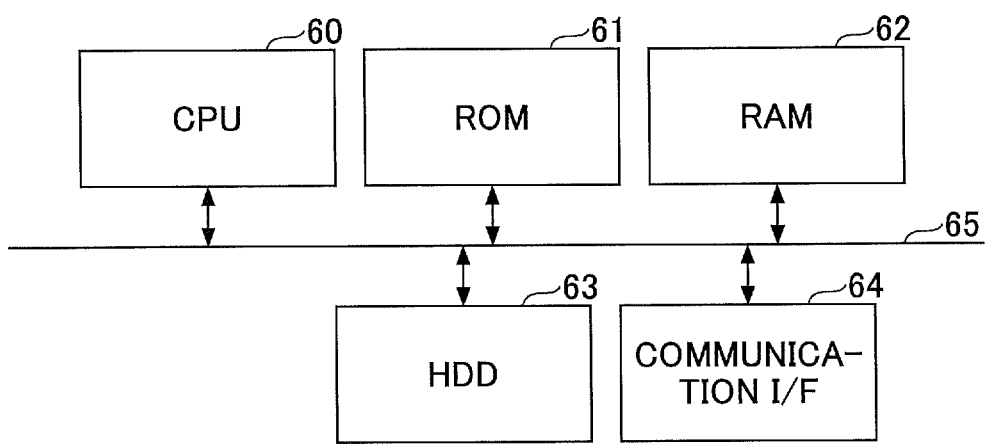
FIG. 3 is a diagram illustrating an example hardware configuration of a server included in the information processing system.

In the following, the hardware configuration of the server 11 will be described with reference to FIG. 3. The server 11 may have a configuration similar to that of a general-purpose PC, for example. In FIG. 3, the server 11 includes a CPU 60, a ROM 61, a RAM 62, an HDD 63, a communication I/F 64, and a system bus 65.

The CPU 60 executes programs stored in the ROM 61 and the HDD 63 and controls operations of the server 11. The ROM 61 is a nonvolatile memory that stores a BIOS that is executed upon starting the server 11 and various setting values, for example. The RAM 62 is a volatile memory that provides a work area for holding a program that is being executed by the CPU 60. The HDD 63 is a nonvolatile storage device that stores an OS, application programs, and various data. Note that although the HDD 63 is used in the present example, in other examples, an SSD or some other suitable storage device may be used instead of the HDD 63.

The communication I/F 64 is a network interface for connecting the server 11 to the network 12 and establishing communication with an external device connected to the network 12, such as the MFP 10, for example. The system bus 65 is connected to the above-described units of the server 11, such as the CPU 60 and the ROM 61, and transmits address signals, data signals and various control signals.

In the following, the functional configuration of the MFP 10 will be described with reference to FIG. 4. According to one embodiment of the present invention, the MFP 10 includes a moving body detection unit 70, a power supply control unit 71, a wireless communication unit 72, a wireless authentication unit 73, an image acquisition unit 74, a feature information extraction unit 75, an image authentication unit 76, a storage unit 77, and a user authentication unit 78. Further, the MFP 10 includes a job determination unit 79, a communication unit 80, a screen generation unit 81, and a display control unit 82.

The moving body detection unit 70 is implemented by the CPU 21 executing a program to detect a moving body (e.g., human) within a detection range in the vicinity of the MFP 10 using the moving body detection sensor 28. The power supply control unit 71 is implemented by the CPU 21 executing a program to control the MFP 10 to transition from normal operation mode to power saving mode when the MFP 10 is not used for more than a preset time period. In the power saving mode, the MFP 10 consumes less power than in normal operation mode, which enables the MFP 10 to implement functions such as printing. In the power saving mode, power consumption is reduced by turning off the functions of the engine 26 and the HDD 24 of the main unit 20 and the functions of the operation unit 30.

When the MFP 10 is in the power saving mode, the power control unit 71 controls power supply to the MFP 10 and causes the operation unit 30 to transition back to normal operation mode for enabling normal operations upon receiving information (human detection information) indicating that a human has been detected from the moving body detection unit 70. The normal operation mode refers to a state in which the operation panel 37 is displaying a screen and the user is able to view and operate the screen. The power supply control unit 71 can control the operation unit 30 to transition back to normal operation mode from power saving mode by sending a relevant instruction to the operation unit 30 via the communication path 50, for example. The power supply control unit 71 can also control the engine 26 and the HDD 24 to transition back to normal operation mode.

When transitioning back to normal operation mode, the operation unit 30 turns on the power of the camera 38 and the wireless communication device 39 to activate the camera 38 and the wireless communication device 39. The wireless communication unit 72 is implemented by the CPU 31 executing a program to communicate with an IC card that is within a detection range in the vicinity of the MFP 10 using the wireless communication device 39 and acquire predetermined information such as a wireless tag ID from the IC card.

Figure 5:
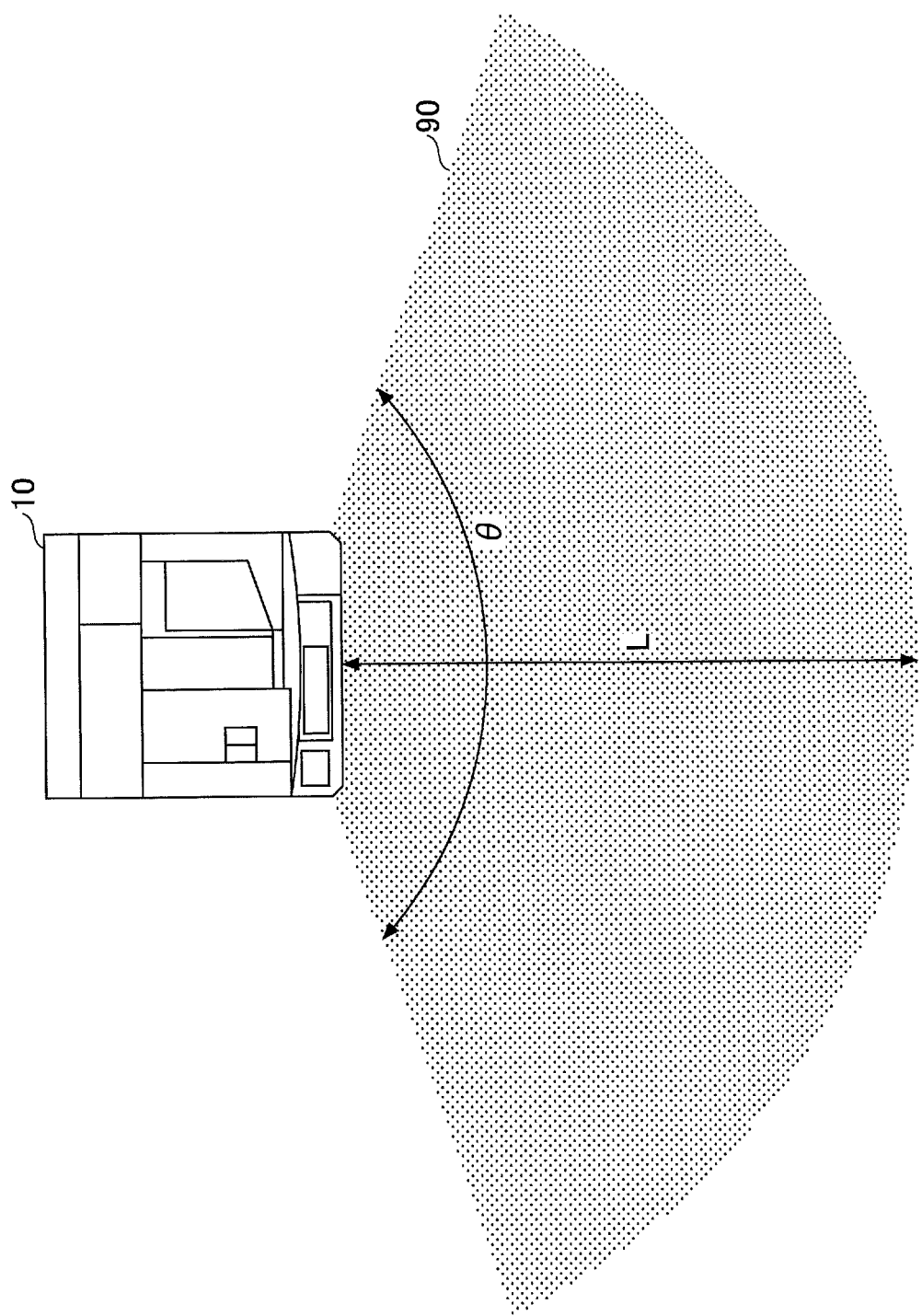
FIG. 5 is a diagram illustrating a detection range of a wireless communication device.

FIG. 5 illustrates an example detection range 90 of the wireless communication device 39. In FIG. 5, the detection range 90 of the wireless communication device 39 is a fan-shaped area in front of the MFP 10. For example, the detection range 90 may have a radius L=3 m with respect to the MFP 10 as the center and an angle $\theta$=150° as the central angle of the fan shape.

Referring back to FIG. 4, the wireless authentication unit 73 is implemented by the CPU 31 executing a program to compare the wireless tag ID acquired through wireless communication by the wireless communication unit 72 with a plurality of wireless tag IDs that are stored in the storage unit 77 in association with a plurality of users. In this way, the wireless authentication unit 73 determines whether there is a matching wireless tag ID stored in the storage unit 77 that matches the acquired wireless tag ID.

The storage unit 77 stores address book data including information such as a wireless tag ID assigned to each user as illustrated in FIG. 6, for example. The address book data is registered with respect to each user and includes an address book number assigned to the user, a user name, an email address, a login ID, a login password, a wireless tag ID, and personal data for image authentication. The address book number is an identification number uniquely assigned to each user and may be an employee ID or some other type of information unique to the user.

The wireless tag ID may be a number having eight digits, for example. The personal data for image authentication can be data of 30×30 pixels with a grayscale of 256 levels corresponding to an extracted image of a face region, for example. Note that the personal data is not limited to a face image but may be feature information of the face, for example. The feature information of the face may include information on the outline of the face and the shapes and/or relative positions of parts of the face, such as the eyes, the nose, the chin, and the cheek bone, for example. Also, the personal data may be an address such as a URL (Uniform Resource Locator) indicating a storage location of the face image data and/or the feature information of the face. In this case, the face image data and the like can be stored in another device, such as the server 11 connected to the network 12, for example.

Note that the storage unit 77 can be provided in each of the main unit 20 and the operation unit 30. When the storage unit 77 is provided in each of the main unit 20 and the operation unit 30, the storage unit of the operation unit 30 may store a portion of the user information constituting the address book data, and the storage unit of the main unit 70 may store the remaining portion of the user information constituting the address book data, for example. The storage unit of the operation unit 30 may have a relatively small storage capacity and may only be able to store about 300 to 1800 sets of user information, for example. However, by dividing and storing the user information in the main unit 20 and the operation unit 30 in the above-described manner, the user information that is stored in the operation unit 30 can be quickly retrieved from the operation unit 30.

Referring back to FIG. 4, the wireless authentication unit 73 notifies the user authentication unit 78 and the job determination unit 79 of an authentication result. When a matching wireless tag ID is found, the wireless authentication unit 73 sends an authentication result indicating that the authentication has been successful. On the other hand, if no matching wireless tag ID is found, the wireless authentication unit 73 sends an authentication result indicating that the authentication has resulted in authentication failure. The authentication result may include an address book number, an employee ID, and/or some other identification information for identifying the user, for example.

The image acquisition unit 74 is implemented by the CPU 31 executing a program to acquire an image captured by the camera 38. FIG. 7 illustrates an example of the image to be acquired by the image acquisition unit 74. As illustrated in FIG. 7, the image includes at least the face of a user 100. For example, the image may be an RGB image of 640×480 pixels with 256 levels for each of the R, G, and B color components.

The feature information extraction unit 75 is implemented by the CPU 31 executing a program to detect and extract a face region 91 corresponding to a face image from the image acquired by the image acquisition unit 74. The face image to be extracted may be an image of 30×30 pixels with a grayscale of 256 levels as illustrated in FIG. 8, for example.

To detect the face region 91, for example, a Haar-like feature for face detection may be used to detect the face region 91. However, the present invention is not limited to using a Haar-like feature, but may also use a LBP (Local Binary Pattern) feature or a HOG (Histogram of Oriented Gradients) feature, for example.

Detection using the Haar-like feature is a technique that involves determining whether an image region corresponds to a face region based on the average luminance difference of a plurality of rectangular regions. In this technique, a weak classifier using a Haar-like feature is used to narrow down a plurality of search areas of various positions and sizes of an image into a few face region candidates. Note that because the weak classifier does not have such a high classifying capability, a learning technique called boosting is used to assign weights to a plurality of weak classifiers through prior training, and several dozen weak classifiers with the top weights are selected to generate a strong classifier. The strong classifier (black and white rectangles pattern representing features of a human face) is then used to determine whether an image region corresponds to a human face region.

Detection using the LBP feature is a technique that involves determining whether an image region corresponds to a face region based on luminance distribution. In this technique, an image is divided into cells, the luminance of a center pixel of each cell is compared with the luminance of neighboring pixels within the same cell, binary data is generated based on whether the luminance of a neighboring cell is higher than that of the center pixel, and a histogram of the sets of binary data of each cell is obtained. Then, a combination of the histograms of all the cells is used to determine whether an image region corresponds to a face region.

Detection using the HOG feature is a technique that involves determining whether an image region corresponds to a face region based on luminance distribution in a gradient orientation. In this technique, an orientation in which the luminance is changing and a luminance difference is obtained for an image cell extracted from an image, a histogram of the orientation gradients is obtained, and a combination of the histograms is used to determine whether an image region corresponds to a face region.

The feature information extraction unit 75 extracts facial feature information from the detected facial region 91. The facial feature information may include information on the shapes and relative positions of certain parts of the face, for example, and may be extracted from luminance distribution information and position information of the face region, for example.

The image authentication unit 76 is implemented by the CPU 31 executing a program to perform image authentication by comparing the facial feature information extracted by the feature information extraction unit 75 with image authentication personal data of a plurality of users stored in the storage unit 77. The image authentication unit 76 can perform image authentication based on whether the personal data stored in the storage unit 77 includes one set of feature information corresponding to the extracted facial feature information.

Note that the image authentication unit 76 may also perform image authentication using the extracted face image instead of the facial feature information, for example. In this case, image authentication may be performed by matching the extracted face image with images of a plurality of users that are registered as personal data in the storage unit 77. For example, matching can be implemented with respect to the stored images of the plurality of users until a matching image is found. Matching can be implemented by finding facial feature points and comparing the facial feature points, or describing luminance values of the pixels of each face image as one vector and applying pattern recognition, for example.

In the case of implementing matching by pattern recognition, a subspace method can be used, for example. In the subspace method, subspaces that express the facial features of registered users in low dimensions are created and a similarity between the face of the user to be authenticated and the face of each registered user is measured.

The similarity can be obtained based on an angle (principal angle) formed between a subspace created for the face of the user to be authenticated and the subspace created for the face of each registered user, for example. Because a subspace is a subset of a vector space, an angle formed by the vectors in the subspaces may be obtained as a measure of similarity, the closer the angle is to 0 (zero), the greater the similarity. Note that if the subspaces perfectly match one another, the angle formed by the subspaces would be 0 (zero). For example, it can be determined that matching has been successful (a match has been found) if the similarity is greater than or equal to a predetermined value. Note that because the subspace method is well-known, detailed descriptions thereof will be omitted.

The image authentication unit 76 notifies the user authentication unit 78 of the result of comparing the facial feature information as the authentication result. In the case where the above-described matching of the face image is implemented, the authentication result may be the result of the matching. Further, if both comparison of the facial feature information and matching of the face image are implemented, the authentication result may include both the result of comparing the facial feature information and the result of matching. The authentication result may include information on whether authentication has been successful and identification information for identifying the user, such as an address book number or an employee ID, for example.

Upon receiving the authentication results from the wireless authentication unit 73 and the image authentication unit 76, the user authentication unit 78 determines whether to allow the user to use the MFP 10. Upon receiving authentication results indicating successful authentication from both the wireless authentication unit 73 and the image authentication unit 76, the user authentication unit 78 compares the user information, such as the address book number, included in the two authentication results, and determines whether the same user is authenticated in the two authentication results. If the same user is authenticated, the user authentication unit 78 determines that the user is allowed to use the MFP 10 and allows the user to login. When the user information included in the authentication results are not the same, the user authentication unit 78 determines that the user is not allowed to use the MFP 10. Also, upon receiving an authentication result indicating authentication failure from at least one of the wireless authentication unit 73 and the image authentication unit 76, the user authentication unit 78 determines that the user is not allowed to use the MFP 10.

The user authentication unit 78 allows the user to use the MFP 10 upon determining that the users authenticated in the two authentication results are the same. However, when one of the two authentication results indicates authentication successful while the other indicates authentication failure, the user authentication unit 78 may send a notification to an approver via email as described above, for example. When the user authentication unit 78 receives a response from the approver indicating that the user has been approved, the user authentication unit 78 assumes that the same user has been authenticated and allows the user to use the MFP 10. On the other hand, when the user authentication unit 78 receives a response from the approver indicating that the user has not been approved, the user authentication unit 78 may determine that the user is not allowed to use the MFP.

The job determination unit 79 determines whether a job has been accepted from the user authenticated by the wireless authentication unit 73. The server 11 holds information on a job being executed and jobs in queue that are to be executed as job list information, and the job determination unit 79 refers to the job list information to determine whether a job has been accepted from the authenticated user.

FIG. 9 illustrates an example of the job list information. The job list information may include, as parameters, a job ID, a job status, an address book number, the user name of the user that has requested the job, and details of the job, for example. The job ID may be a number assigned to each job that has been accepted and is identification information for identifying the job. The job status is information, such as "printing" or "waiting", indicating the execution status of the job. The job list information may also include other parameters, such as the data name (document name) of the image data to be printed, the number of pages of the document, the number of copies to be printed, for example.

When user A corresponds to the user authenticated by the wireless authentication unit 73, for example, the job determination unit 79 refers to the user name of the job list information of FIG. 9 to determine whether user A is listed in the job list information. In this way, the job determination unit 79 can determine whether a job has been accepted from user A.

The communication unit 80 communicates with the server 11 and acquires print job information (job information relating to a print job) from the server 11. Because the server 11 holds the job list information as illustrated in FIG. 9, the communication unit 80 acquires the job list information from the server 11. The communication unit 80 can store the acquired job list information in the storage unit 77 and can pass the job list information to the job determination unit 79 to enable execution of the above determination process.

The screen generation unit 81 uses the job list information to generate a job list screen to be displayed on the operation panel 37 after a user is logged in. The screen generation unit 81 may generate a screen including a job ID, a job status, the user name of the user that has requested the job, and details of the job as the job list screen, for example.

Note that the acquisition of the job list information by the communication unit 80 and the generation of the job list screen by the screen generation unit 81 are performed in parallel with the image acquisition by the image acquisition unit 74, facial feature information extraction by the feature information extraction unit 75, image authentication by the image authentication unit 76, and the determination of whether to allow use of the MFP 10 by the user authentication unit 78.

The display control unit 82 controls the screen displayed on the operation panel 37 based on the result of the determination made by the user authentication unit 78. Specifically, when a user logs into the MFP 10 as a result of the user authentication unit 78 determining that the user is allowed to use the MFP 10, the display control unit 82 controls the display panel 37 to display the screen generated by the screen generation unit 81.

By executing processes in parallel as described above, the screen for the user may be displayed without delay at the time the user logs in, and the user can select a job immediately thereafter such that the user can have the job executed without feeling any stress.

Figure 10:
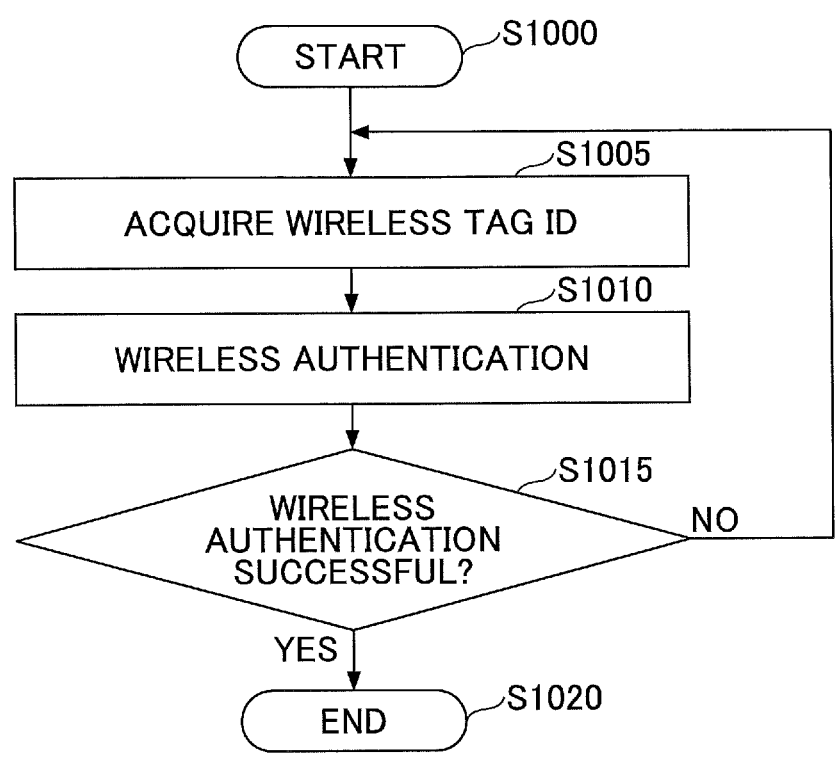
FIG. 10 is a flowchart illustrating an example process flow of a wireless authentication process.

In the following, wireless authentication using an IC card will be described with reference to FIG. 10.

In step S1000, when a user approaches the MFP 10, the moving object detection unit 70 detects the presence of a human (user), and the power supply control unit 71 controls the MFP 10 to transition back to normal operation mode from power saving mode such that the camera 38 and the wireless communication device 39 are activated. In this way, the process of FIG. 10 is started. In step S1005, the wireless communication unit 72 acquires the wireless tag ID recorded in an IC card carried by the user using the wireless communication device 39. In step S1010, the wireless authentication unit 73 executes wireless authentication using the acquired wireless tag ID. Note that the wireless authentication executed by the wireless authentication unit 73 is described in detail above, and as such, a description thereof is hereby omitted.

In step S1015, the wireless authentication unit 73 determines whether the wireless authentication has been successful, and in the case of successful authentication, the wireless authentication unit 73 notifies the user authentication unit 78 of the authentication result indicating successful authentication and the address book number associated with the wireless tag ID, after which the process is ended in step 1020. On the other hand, if the authentication ends in failure, the process returns to step S1005 to acquire the wireless tag ID once again.

In the following, image authentication will be described with reference to FIG. 11.

Figure 11:
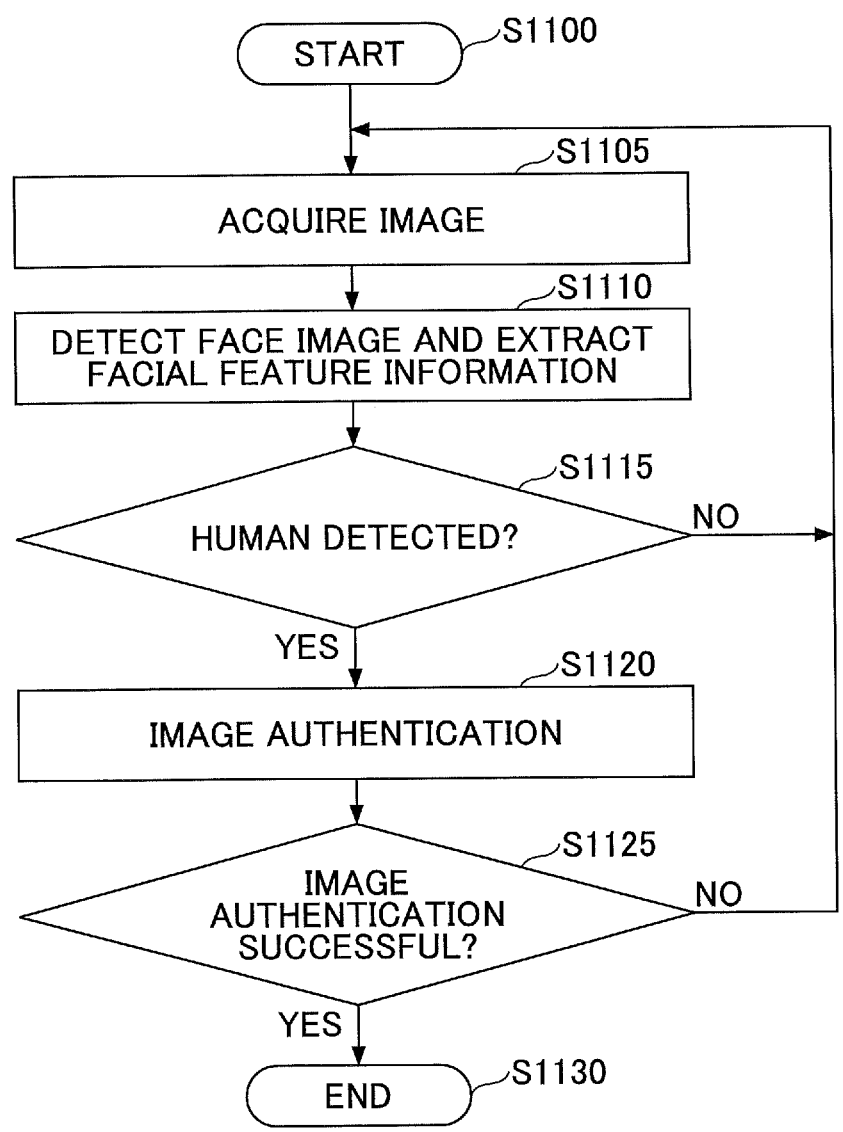
FIG. 11 is a flowchart illustrating an example process flow of an image authentication process.

In step S1100, the process of FIG. 11 is started in response to the camera 38 capturing an image of an imaging object. In step S1105, the image acquisition unit 74 acquires the captured image from the camera 38. In step S1110, the feature information extraction unit 75 detects a face image (face region) from the acquired image and extracts facial feature information from the face image.

In step S1115, the feature information extraction unit 75 determines whether a human has been detected based on whether a face image has been detected. If a human has been detected, the process proceeds to step S1120. If no human is detected, the process returns to step S1105, and the image acquisition unit 74 acquires a next image. In step S1120, the image authentication unit 76 executes image authentication using the extracted facial feature information.

In step S1125, the image authentication unit 76 determines whether the image authentication has been successful. In the case where the authentication has been successful, the image authentication unit 76 notifies the user authentication unit 78 of the authentication result indicating successful authentication and the address book number associated with the personal data corresponding to the facial feature information used in the image authentication, after which the process is ended in step S1130. On the other hand, if the authentication ends in failure, the process returns to step S1105, and the image acquisition unit 74 acquires a next image.

Figure 12:
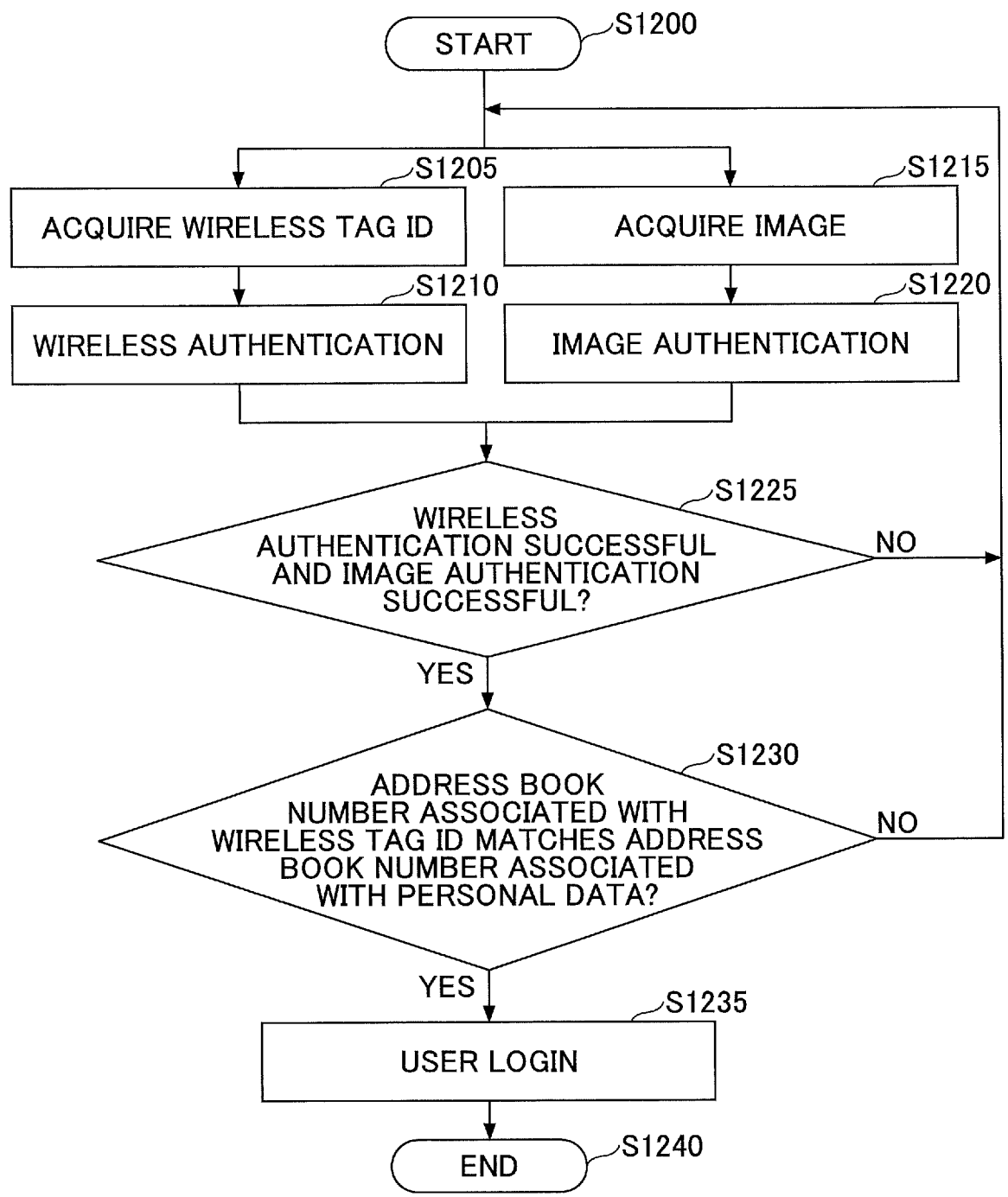
FIG. 12 is a flowchart illustrating an example process flow of a combined authentication process.

In the following combined authentication combining wireless authentication and image authentication will be described with reference to FIG. 12.

In step S1200, the combined authentication process is started. In step S1205, the user enters a range where the wireless communication device 39 can establish wireless communication with an IC card carried by the user and the wireless communication unit 72 acquires a wireless tag ID from the IC card. In step S1210, the wireless authentication unit 73 performs wireless authentication using the acquired wireless tag ID.

In parallel with the processes of steps S1205 and S1210, in step S1215, the image acquisition unit 74 acquires an image, and the feature information extraction unit 75 detects a face image from the image acquired by the image acquisition unit 74 and extracts facial feature information from the face image. In step S1220, the image authentication unit 76 performs image authentication using the extracted facial feature information.

Note that in practice, the process of step S1205 for acquiring the wireless tag ID may be executed first, and the image acquisition process of step S1215 and the image authentication process of step S1220 may be executed in parallel with the wireless authentication process of step S1210, for example.

In step S1225, the user authentication unit 78 determines whether the authentication result of step 1210 and the authentication result of step 1220 respectively indicate successful wireless authentication and successful image authentication. If both are unsuccessful or if one is successful while the other is unsuccessful, the process returns to steps S1205 and S1215 to acquire the wireless tag ID and acquire an image again.

If both the wireless authentication and the image authentication are successful, the process proceeds to step S1230, where the user authentication unit 78 determines whether the address book number associated with the wireless tag ID used in the wireless authentication and the address book number associated with the personal data corresponding to the facial feature information used in the image authentication match one another. If they do not match, the process returns to steps S1205 and S1215 to acquire the wireless tag ID and acquire an image again. If they match, the process proceeds to step S1235, where the user logs in, after which the combined authentication process is ended in step S1240.

An example case where the address book numbers do not match includes a case where a user carrying an IC card passes the MFP 10 while a registered user that does not have an IC card is in front of the MFP 10. In such a case, a user may not be able to log in until the address book numbers match.

Figure 4:
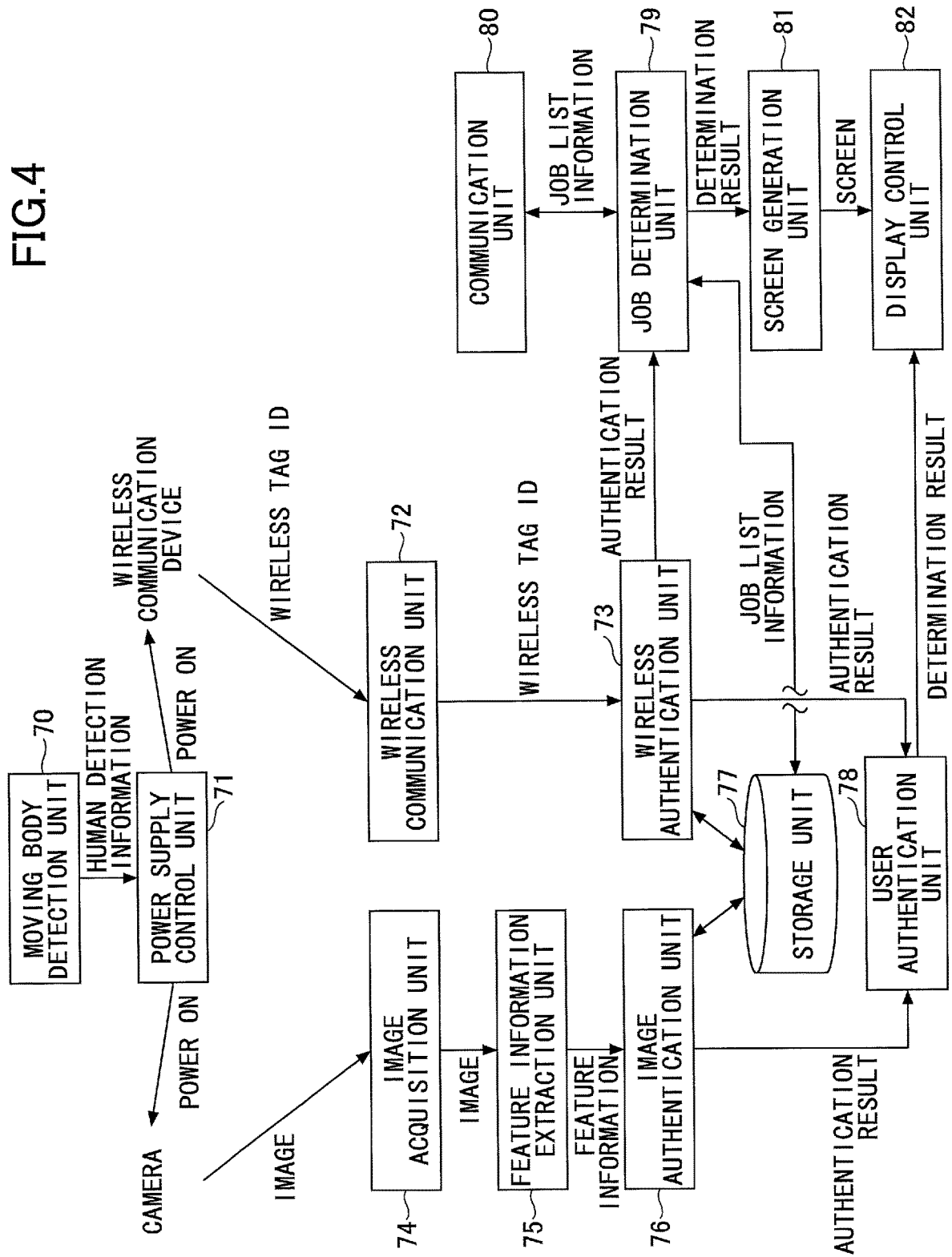
FIG. 4 is a diagram illustrating an example functional configuration of the multifunctional peripheral.
Figure 13:
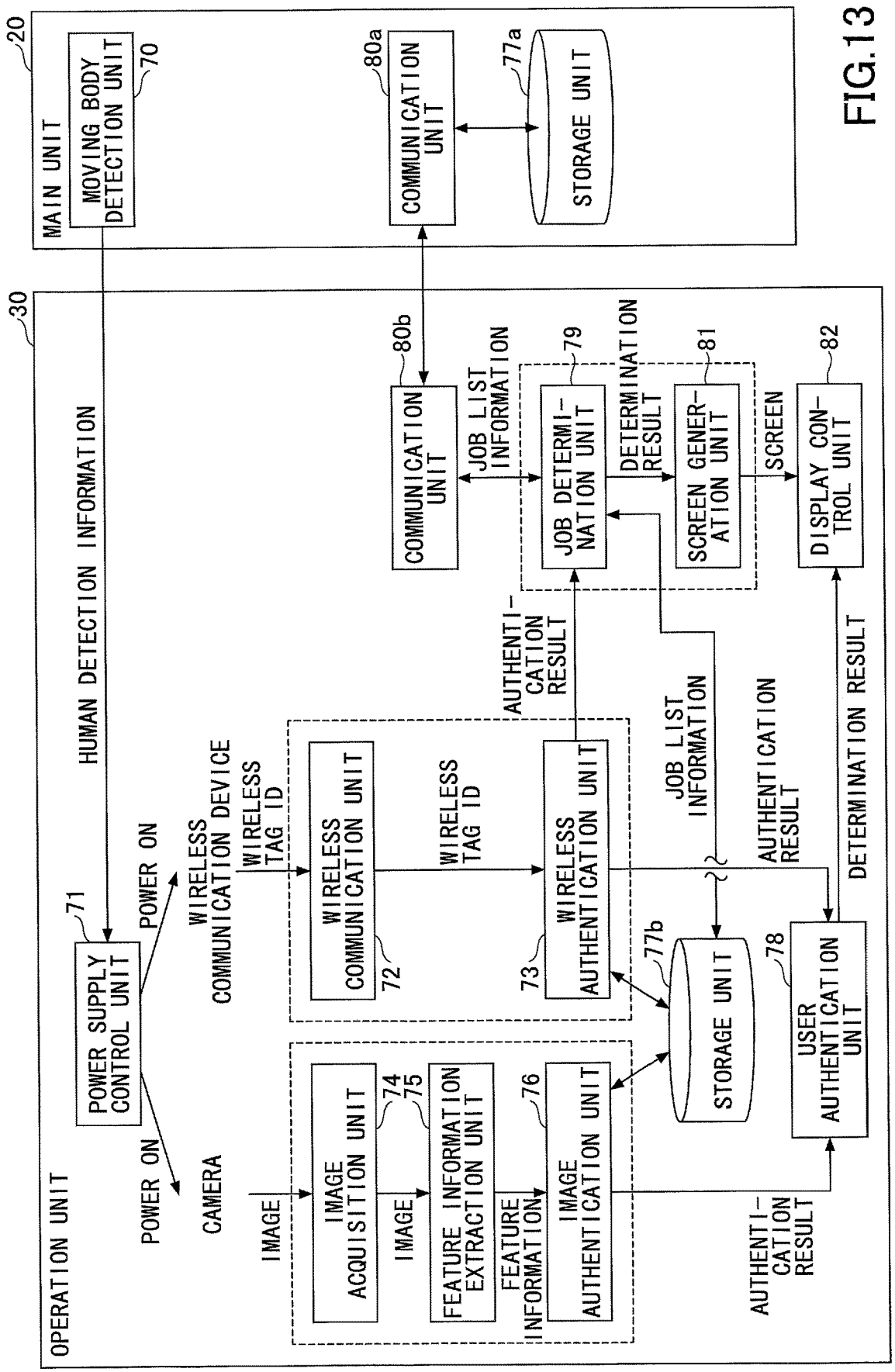
FIG. 13 is a diagram illustrating another example functional configuration of the multifunctional peripheral.

As described above, the MFP 10 may have an overall functional configuration as illustrated in FIG. 4. As a more specific example, the MFP 10 including the main unit 20 and the operation unit 20 may have a functional configuration as illustrated in FIG. 13. In FIG. 13, the communication unit 80 is provided in each of the main unit 20 and the operation unit 30 of the MFP 10 as communication units 80a and 80b for establishing communication between the main unit 20 and the operation unit 30. Also, the storage unit 77 is provided in each of the main unit 20 and the operation unit 30 of the MFP 10 as storage units 77a and 77b.

Note that the main unit 20 stores address book information in the storage unit 77b and has an OS (first operating system), such as Linux (registered trademark), and an image forming application for operating hardware (e.g., scanner or a printer) installed therein to implement various functions, such as a printing function, a copying function, a scanner function, and a facsimile function, for example. The operation unit 30 includes an input unit for enabling a user to input an operation instruction to the main unit 20 and has an OS (second operating system), such as Linux (registered trademark), and a plurality of applications including various functional units for implementing various functions installed therein.

The plurality of applications may include a wireless authentication application, a face authentication application, and a pull print application, for example, and these applications can be run on the OS of the operation unit 30.

The wireless authentication application includes at least the wireless authentication unit 73 and may also include the wireless communication unit 72 as indicated by a broken line surrounding these units in FIG. 13. The face authentication application includes at least the image authentication unit 76 and may also include the image acquisition unit 74 and the feature information extraction unit 75 as indicated by a broken line surrounding these units in FIG. 13. The pull print application includes the job determination unit 79 and the screen generation unit 81 as indicated by a broken line surrounding these units in FIG. 13. The pull print application acquires job information relating to a print job from an external server and submits the print job to the image forming application of the main unit 20.

Note that when the pull print application acquires the job information from the external server and image authentication implemented by the face authentication application at this time is not successful, the display control unit 82 may display a screen prompting image authentication by the face authentication application on top of a job list screen, for example.

Figure 14:
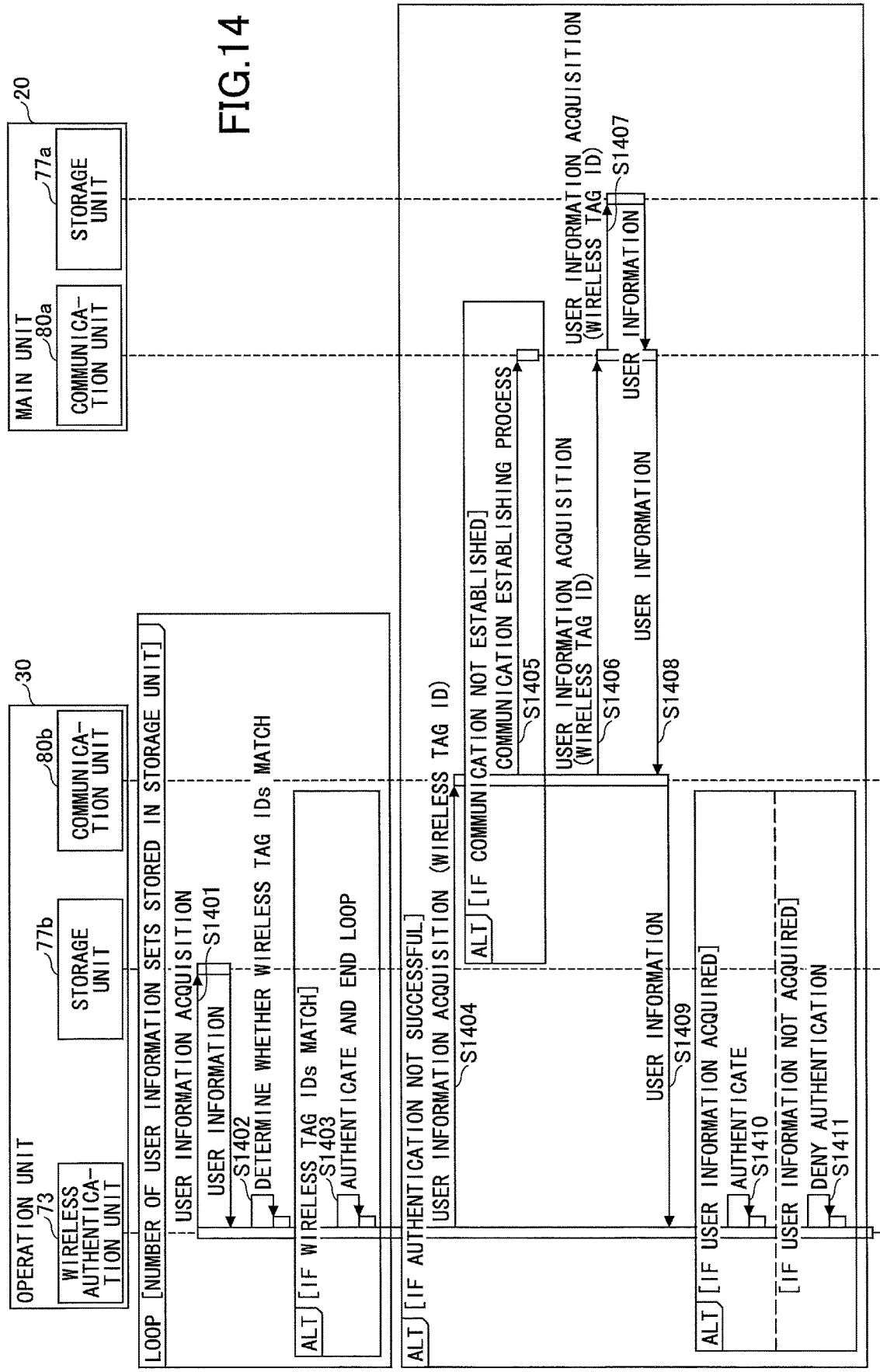
FIG. 14 is a sequence chart illustrating an example process flow of a wireless authentication process implemented by the multifunction peripheral having the functional configuration of FIG. 13.

FIG. 14 is a sequence chart illustrating an example wireless authentication process implemented by the MFP 10 having the functional configuration as illustrated in FIG. 13. In FIG. 14, the communication unit 80a and the storage unit 77a of the main unit 20, and the wireless communication unit 73, the communication unit 80b, and the storage unit 77b of the operation unit 30 are illustrated. Note that illustrations of the other functional units of the main unit 20 and the operation unit 30 are omitted in FIG. 14. Note that the storage capacity of the storage unit 77b of the operation unit 30 is relatively small such that only user information of specific users can be stored therein. As such, user information of other users is stored in the storage unit 77a of the main unit 20 having a relatively larger storage capacity.

Thus, when the wireless authentication unit 73 acquires the wireless tag ID from an IC card, the wireless authentication unit 73 first searches the storage unit 77b of the operation unit 30, and if the wireless tag ID is not stored in the storage unit 77b, the wireless authentication unit 73 searches the storage unit 77a of the main unit 20. If the acquired wireless tag ID is stored in one of the storage units 77a and 77b, the wireless authentication is deemed successful, and if not, the wireless authentication is deemed unsuccessful.

In FIG. 14, the wireless authentication unit 73 of the operation unit 30 acquires user information of one user from the address book data stored in the storage unit 77b upon receiving a wireless tag ID that has been acquired from an IC card by the wireless communication unit 72 (step S1401). In the case where the storage unit 77b stores the address book data as illustrated in FIG. 6, for example, user information of one user may be acquired from the address book data in chronological order starting with data 1 (address book number "001").

The user information of one user may be stored as data in the format of a text file and acquired as a text file, for example. When the user information of one user is stored as a text file, the wireless tag ID of the user may be used as the file name of the text file. For example, if the wireless tag ID is "00522213", a file name of "00522213.txt" may be assigned to the text file and stored in the storage unit 77. Note that the wireless tag ID is unique information for each user, and as such, no two users will have the same wireless tag ID. Also, by using the wireless tag ID as a file name, the text file can be searched using only the file name without referring to the content of the text file such that a search as described below can be quickly performed, for example.

Upon acquiring the user information of one user, the wireless authentication unit 73 determines whether the received wireless tag ID matches the wireless tag ID included in the acquired user information (step S1402). If it is determined that the wireless tag IDs match, the wireless authentication unit 73 authenticates the corresponding user and the wireless authentication process is ended (step S1403). If the wireless tag IDs do not match, the process returns to S1401 to acquire the next data (user information), and the process is repeated until authentication is successful.

If the received wireless tag ID does not match any of the wireless tag IDs included in the user information of the plurality of users stored in the storage unit 77b, the wireless authentication unit 73 transmits the wireless tag ID to the communication unit 80b and requests the communication unit 80b to acquire user information of a user associated with the wireless tag ID (step S1404). Upon receiving the user information acquisition request, the communication unit 80b first determines whether communication with the communication unit 80a of the main unit 20 is established, and if not, the communication unit 80b establishes communication with the communication unit 80a (step S1405). After establishing communication with the communication unit 80a, the communication unit 80b sends a user information acquisition request to the communication unit 80a (step S1406). At this time, the communication unit 80b sends the wireless tag ID to the communication unit 80a.

Upon receiving the user information acquisition request from the communication unit 80b, the communication unit 80a of the main unit 20 searches the user information in the address book data stored in the storage unit 77a using the wireless tag ID received together with the user information acquisition request as a search key to acquire user information including a matching wireless tag ID matching the search key (step S1407). The communication unit 80a transmits the acquired user information to the communication unit 80b of the operation unit 30 (step S1408), and the communication unit 80b transmits the received user information to the wireless authentication unit 73 (step S1409).

If the wireless authentication unit 73 has been able to acquire the requested user information from the communication unit 80b, the wireless authentication unit 73 determines that the user information including the received wireless tag ID is stored in the main unit 20 and authenticates the corresponding user (step S1410).

If user information including a matching wireless tag ID is not found in step S1407, the communication unit 80a does not transmit the requested user information to the communication unit 80b. In this case, the wireless authentication unit 73 cannot acquire the user information from the communication unit 80b, and as such, the wireless authentication unit 73 determines that the user information including the received wireless tag ID is not stored in the main unit 20 and therefore denies authentication (step S1411).

In the present example, the communication unit 80b of the operation unit 30 requests the communication unit 80a of the main unit 20 to acquire user information by transmitting the wireless tag ID. However, the present invention is not limited thereto, and in other examples, the communication unit 80b may request for user information of one user at a time in requesting the user information stored in the main unit 20, and the wireless authentication unit 73 may determine whether the wireless tag ID included in the user information matches the received wireless tag ID each time it acquires user information of one user from the main unit 20.

Figure 15:
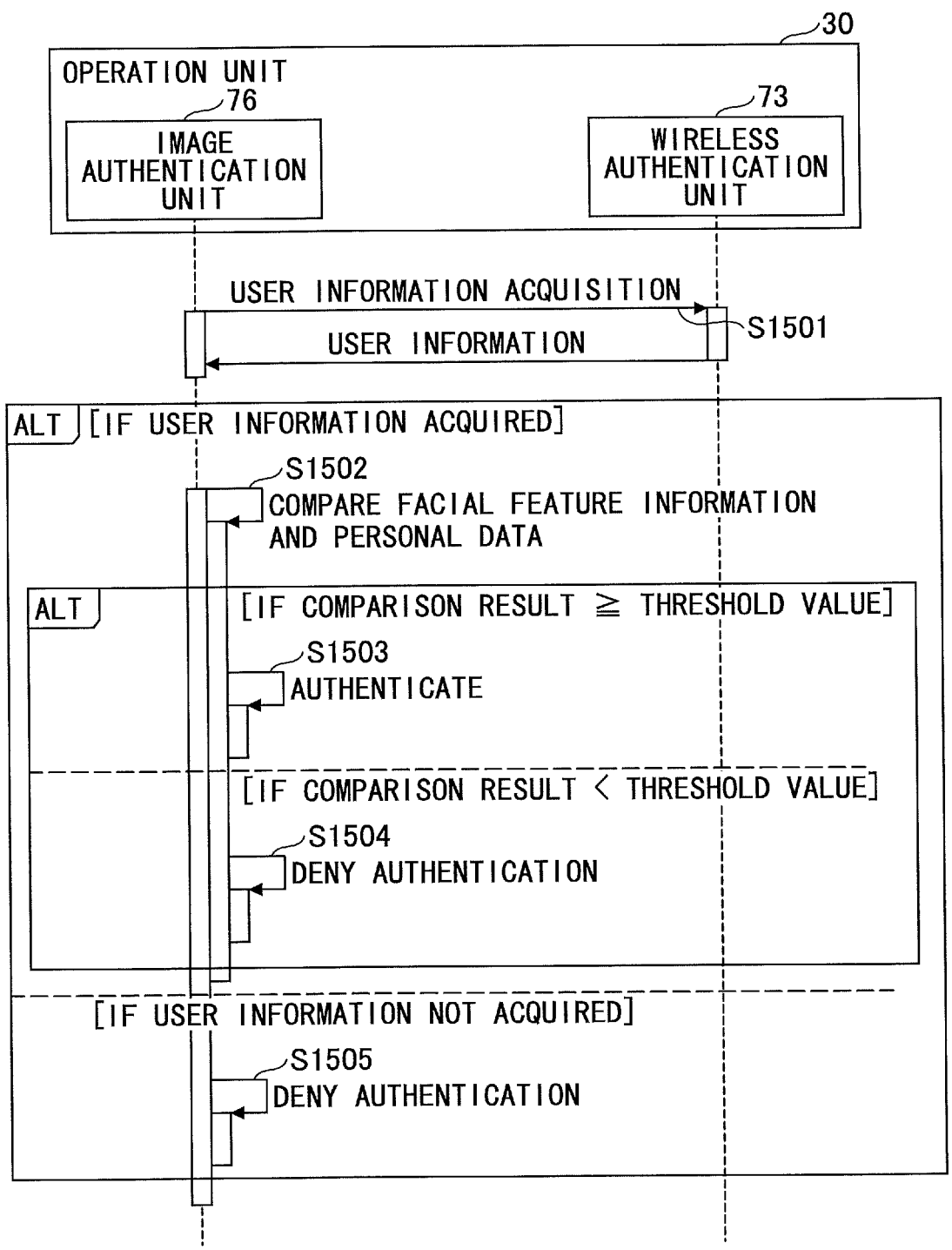
FIG. 15 is a sequence chart illustrating an example process flow of an image authentication process implemented by the multifunctional peripheral having the functional configuration of FIG. 13.

In the following, an example image authentication process implemented by the MFP 10 having the functional configuration as illustrated in FIG. 13 is described with reference to FIG. 15. The image authentication process of FIG. 15 starts when the feature information extraction unit 75 extracts facial feature information from a face image. In the present example, it is assumed that the wireless authentication unit 73 of the operation unit 30 has already acquired user information in step S1401 or S1407 of FIG. 14. Thus, the image authentication unit 76 acquires the user information from the wireless authentication unit 73 (step S1501). Note that the acquired user information includes facial feature information as personal data for image authentication as illustrated in FIG. 6, for example.

When the image authentication unit 76 successfully acquires the user information from the wireless authentication unit 73, the image authentication unit 76 implements the above-described image authentication (face authentication) technique, and compares the facial feature information extracted by the feature information extraction unit 75 with the personal data for image authentication included in the user information acquired from the wireless authentication unit 73 (step S1502). The facial feature information includes feature information of various parts of the face (e.g., features and positions of parts of the face). Because it is unlikely for the facial feature information stored as personal data to include feature information exactly matching the feature information of all the various parts of the face included in the extracted facial feature information, a threshold value may be set up, and the image authentication unit 76 may determine whether the number of matching sets of feature information (comparison result) is greater than or equal to the threshold value, for example.

Also, because it is unlikely for the features and positions of parts of the face to completely match, the image authentication unit 76 may determine that facial feature information being compared with the extracted facial feature information is a match if they are sufficiently similar. The similarity between the facial feature information may be determined, for example, based on whether the ratio of matching pixel values with respect to the pixel values of the pixels constituting the image region of the relevant part is greater than or equal to a certain value. However, this is merely one example method of determining the similarity, and the present invention is not limited to this method.

If the comparison result is greater than or equal to the threshold value, the image authentication unit 76 authenticates the corresponding user (step S1503). If the comparison result is less than the threshold value, the image authentication unit 76 denies authentication (step S1504). Also, if the image authentication unit 76 fails to acquire the user information from the wireless authentication unit 73, the image authentication unit 76 denies authentication (S1505).

Note that an example process flow in which wireless authentication is performed, followed by image authentication is described. However, the wireless authentication and the image authentication may also be performed in parallel, for example.

Figure 16:
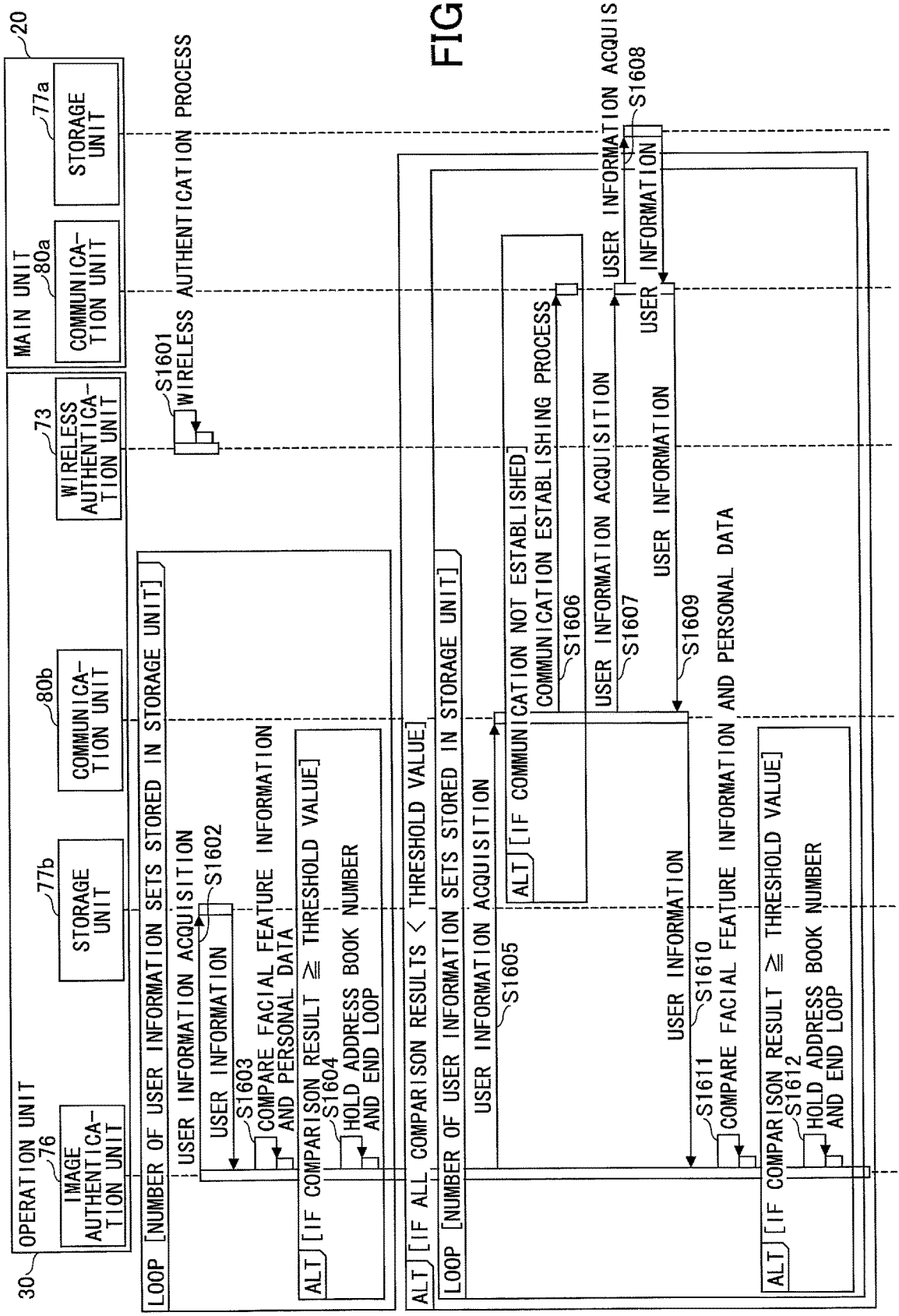
FIG. 16 is a sequence chart illustrating a part of a combined authentication process implemented by the multifunction peripheral having the functional configuration of FIG. 13.

FIG. 16 is a sequence chart illustrating an example process flow in which wireless authentication and image authentication are performed in parallel. As in the process illustrated in FIG. 14, the wireless authentication unit 73 performs wireless authentication (step S1601). When the wireless authentication is successful, the wireless authentication unit 73 holds onto the address book number included in the user information. Note that although the address book number is held in the present example, the wireless authentication unit 73 may also hold on to some other type of information that can identify the user, such as an employee ID, a user name, a wireless tag ID, or an email address, for example. Note that because the wireless authentication performed in step S1601 may be substantially identical to the wireless authentication described above with reference to FIG. 14, and as such detailed descriptions thereof are hereby omitted.

In parallel with the above wireless authentication performed by the wireless authentication unit 73, the image authentication unit 76 performs image authentication by acquiring user information of one user from the address book data stored in the storage unit 77b of the operation unit 30 (step S1602). The image authentication unit 76 compares the facial feature information extracted by the feature information extraction unit 75 with the personal data for image authentication included in the acquired user information (step S1603). As a result of the comparison, if the number of matching sets of feature information (comparison result) is greater than or equal to the threshold value, the image authentication unit 76 determines that the image authentication is successful and holds on to the address book number included in the acquired user information (S1604). If the comparison result is less than the threshold value, the process returns to step S1602 to acquire the next data, and the process is repeated until the image authentication is successful.

In the case where the image authentication unit 76 performs the comparison with respect to all the user information stored in the storage unit 77b of the operation unit 30 and determines that all the comparison results are less than the threshold value, the image authentication unit 76 sends a user information acquisition request to the communication unit 80b (step S1605). Upon receiving the user information acquisition request, the communication unit 80b first determines whether communication is established with the communication unit 80a of the main unit 20. If communication with the communication unit 80a is not established, the communication unit 80b establishes communication with the communication unit 80a (step S1606). When communication is established, or after communication is established, the communication unit 80b sends a user information acquisition request to the communication unit 80a (step S1607).

Upon receiving the user information acquisition request from the communication unit 80b, the communication unit 80a of the main unit 20 acquires user information of one user from the address book data stored in the storage unit 77a (step S1608). The communication unit 80a transmits the acquired user information to the communication unit 80b of the operation unit 30 (step S1609), and the communication unit 80b transmits the received user information to the image authentication unit 76 (step S1610).

The image authentication unit 76 compares the facial feature information extracted by the feature information extraction unit 75 with the personal data for image authentication included in the user information received from the communication unit 80*b* (step S1611). As a result of the comparison, if the number of matching sets of feature information (comparison result) is greater than or equal to the threshold value, the image authentication unit 76 determines that the image authentication is successful and holds on to the address book number included in the user information (step S1612). If the comparison result is less than the threshold value, the process returns to step S1605 to acquire the next data and the process is repeated until authentication is successful.

Figure 17:
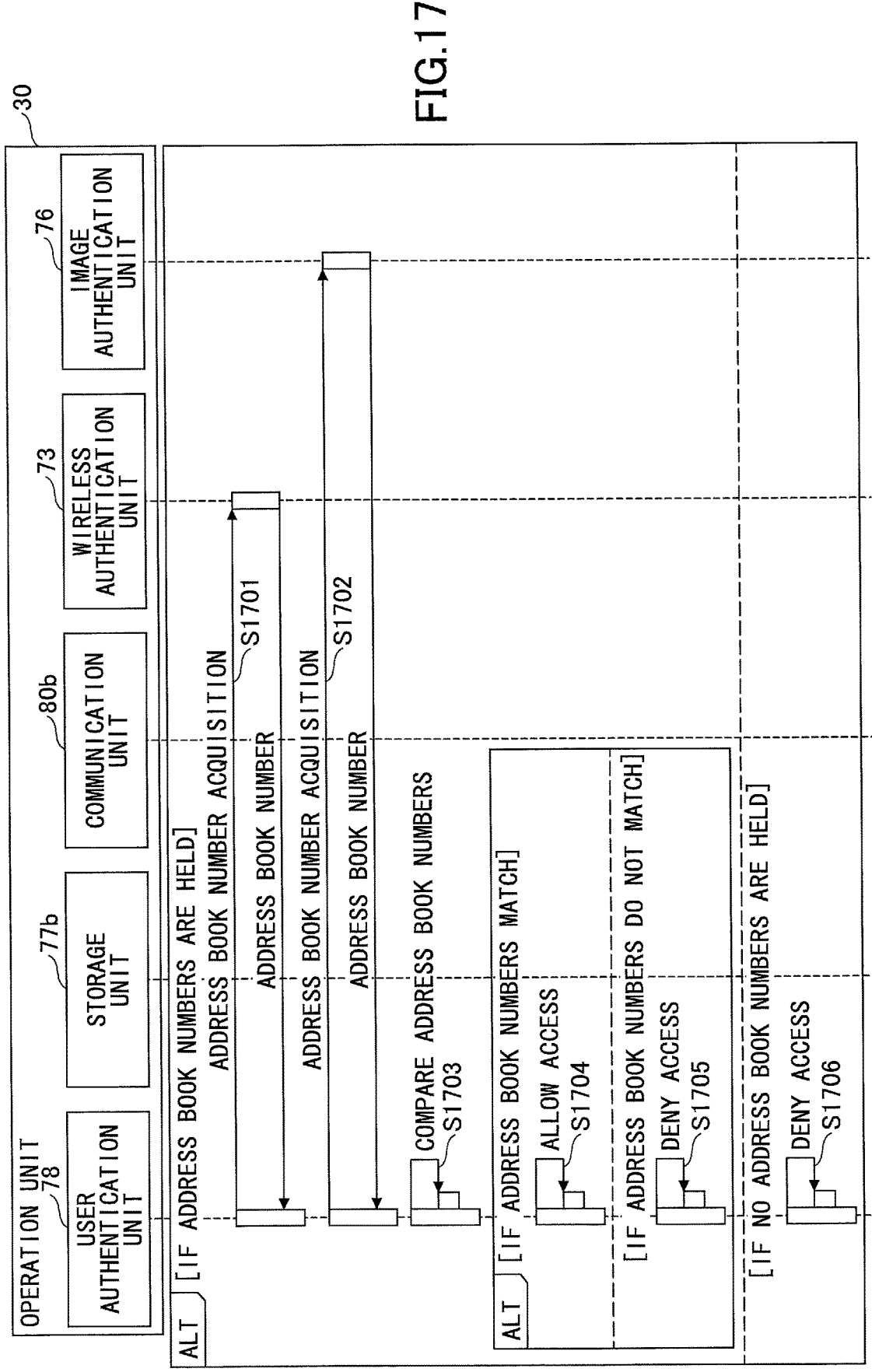
FIG. 17 is a sequence chart illustrating a remaining part of the combined authentication process.

FIG. 17 is a sequence chart illustrating an example process flow for determining whether to allow use of the MFP 10. When the wireless authentication unit 73 holds an address book number the user authentication unit 78 acquires the address book number from the wireless authentication unit 73 (step S1701). When the image authentication unit 76 holds an address book number, the user authentication unit 78 acquires the address book number from the image authentication unit 76 (step S1702).

The user authentication unit 78 compares the address book number acquired from the wireless authentication unit 73 with the address book number acquired from the image authentication unit 76 (step S1703). If the two address book numbers are found to match as a result of the comparison, use of the MFP 10 is allowed (step S1704) and the corresponding user is logged in. If the two address book numbers do not match, use of the MFP 10 is not allowed (step S1705). That is, in step S1704, the user is successfully authenticated, and in step S1705, the user is not authenticated.

The wireless authentication unit 73 does not authenticate the user if the wireless tag IDs do not match. The image authentication unit 76 does not authenticate the user if the comparison result is not greater than or equal to the threshold value. In the case where authentication is not successful, the wireless authentication unit 73 and the image authentication unit 76 do not hold address book numbers, and as such the user authentication unit 78 cannot acquire address book numbers to be compared. Thus, when one or both address book numbers cannot be acquired, the user authentication unit 78 does not allow use of the MFP 10 (step S1706). That is, in step S1706, the user is not authenticated.

The wireless authentication process, the image authentication process, and the process of determining whether to allow use of the MFP 10 have been described in detail above. In the following, an example process flow starting from the wireless authentication process to the activation of a screen after a user is logged in is described with reference to FIG. 18.

Figure 18:
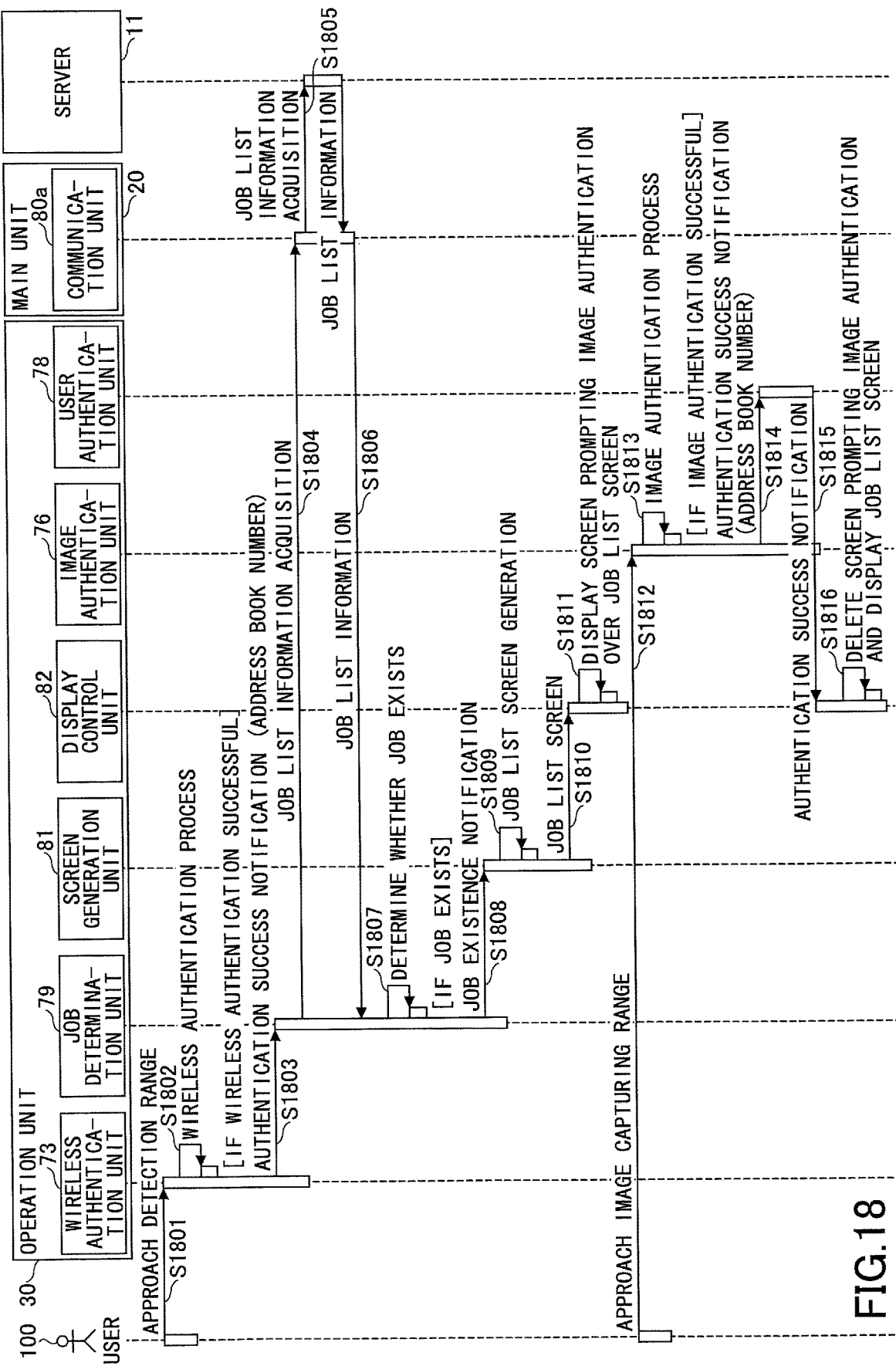
FIG. 18 is a sequence chart illustrating an example process flow of a determination process for determining whether to allow use of the multifunction peripheral.

In FIG. 18, a user 100 carrying an IC card moves to (approaches) a detection range (area) where the MFP 10 can detect the IC card (step S1801).

When the IC card is detected, the wireless communication unit 72 acquires a wireless tag ID from the IC card, and the wireless authentication unit 73 performs wireless authentication using the acquired wireless tag ID. Note that a description of the process of acquiring the wireless tag ID is hereby omitted for the sake of simplifying the description. When the wireless tag ID is acquired as a result of the user approaching the MFP 10, the wireless authentication unit 73 performs a wireless authentication process with respect to the acquired wireless tag ID (step S1802).

The wireless authentication process by the wireless authentication unit 73 may result in authentication success or authentication failure. When the wireless authentication is not successful, subsequent process steps are not performed.

As such, a case where the wireless authentication process results in successful authentication is described below. The wireless authentication unit 73 notifies the job determination unit 79 that the authentication has been successful together with the address book number (step S1803). At this time, although not shown in FIG. 18, the wireless authentication unit 73 also notifies the user authentication unit 78 that the authentication has been successful together with the address book number. The job determination unit 79 requests the communication unit 80*a* of the main unit 20 to acquire job list information via the communication unit 80*b* (step S1804).

The communication unit 80*a* acquires the job list information from the server 11 (step S1805) and transmits the acquired job list information to the job determination unit 79 (step S1806).

The job determination unit 79 determines whether a job with a matching address book number matching the address book number received from the wireless authentication unit 73 is listed in the received job list information (step S1807). A job with a matching address book number is a job that the corresponding user has previously submitted (requested) for execution. If there is no job for which the user has requested execution, subsequent process steps are not performed. As such, in the following, it is assumed that there is such a job exists.

The job determination unit 79 notifies the screen generation unit 81 of the existence of the job together with the acquired job list information (step S1808). The screen generation unit 81 uses the job list information to generate a job list screen to be displayed on the operation panel 37 after the user is logged in (step S1809). The screen generation unit 81 transmits the generated job list screen to the display control unit 82 (step S1810). The display control unit 82 arranges the generated job list screen underneath a screen prompting image authentication such that the generated screen cannot be seen by the user 100 and displays the screen prompting image authentication (step S1811).

The user 100 further approaches an image capturing range where an image including the face of the user 100 can be captured (step S1812). When an image is captured, the image acquisition unit 74 acquires the captured image, and the feature information extraction unit 75 extracts facial feature information from the acquired image. Note, however, that in order to simplify the description, these processes are not described in FIG. 18. When facial feature information is extracted as a result of the user 100 approaching the image capturing range, the image authentication unit 76 performs an image authentication process (step S1813). Note that subsequent process steps are not performed unless the image authentication is successful, and as such the case where the image authentication is successful is described below. The image authentication unit 76 notifies the user authentication unit 78 that the authentication has been successful together with the address book number (step S1814).

The user authentication unit 78 compares the address book number acquired from the wireless authentication unit 73 and the address book number acquired from the image authentication unit 76, and if they match, the user authentication unit 78 allows the user to use the MFP 10 and enables the user to login. After the user logs in, the user authentication unit 78 notifies the display control unit 82 that the user has logged in (step S1815). The display control unit 82 deletes the screen prompting image authentication screen that has been arranged on top of the job list screen to display the job list screen (step S1816). By deleting the screen prompting image authentication and displaying the job list screen that has been arranged underneath the screen prompting image authentication, appropriate screens may be promptly displayed.

Note that if the wireless authentication process performed in step S1802 results in authentication failure, a screen prompting authentication by manual input may be displayed, for example. Also, if it is determined in step S1807 that a job requested by the user that has been authenticated by wireless authentication does not exist in the job list information, a screen prompting image authentication for enabling the user to use the functions of the MFP 10 may be displayed, for example. If the image authentication process performed in step S1810 results in authentication failure, a screen prompting authentication by manual input similar to that displayed when wireless authentication fails may be displayed, for example.

Figure 19:
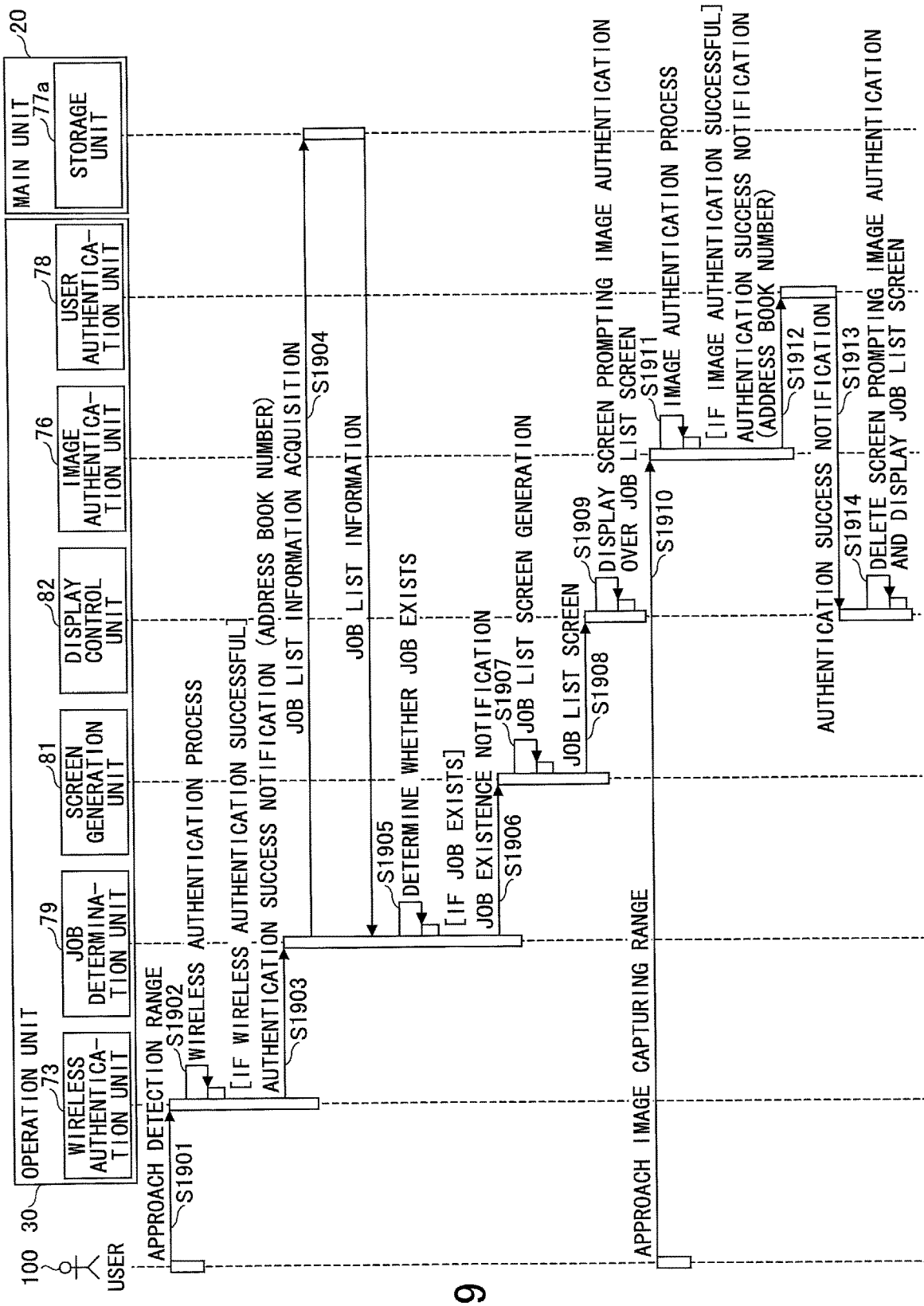
FIG. 19 is a sequence chart illustrating a first example process flow from wireless authentication to screen activation after user login.

Note that in the example illustrated in FIG. 18, the job list information is acquired from the sever 11. The communication unit 80a of the main unit 20 communicates with the server 11, periodically acquires job list information from the server 11, and stores the acquired job list information in the storage unit 70a. Thus, the job determination unit 78 may alternatively acquire the job list information from the storage unit 77a rather than the server 11, for example. FIG. 19 is a sequence chart illustrating a process flow to be executed in such a case. Note that the process flow of FIG. 19 is substantially identical to that of FIG. 18 aside from the difference in the location from which the job list information is acquired (server 11 in FIG. 18, storage unit 77a in FIG. 19). As such, descriptions of the processes of FIG. 19 are hereby omitted.

Figure 20:
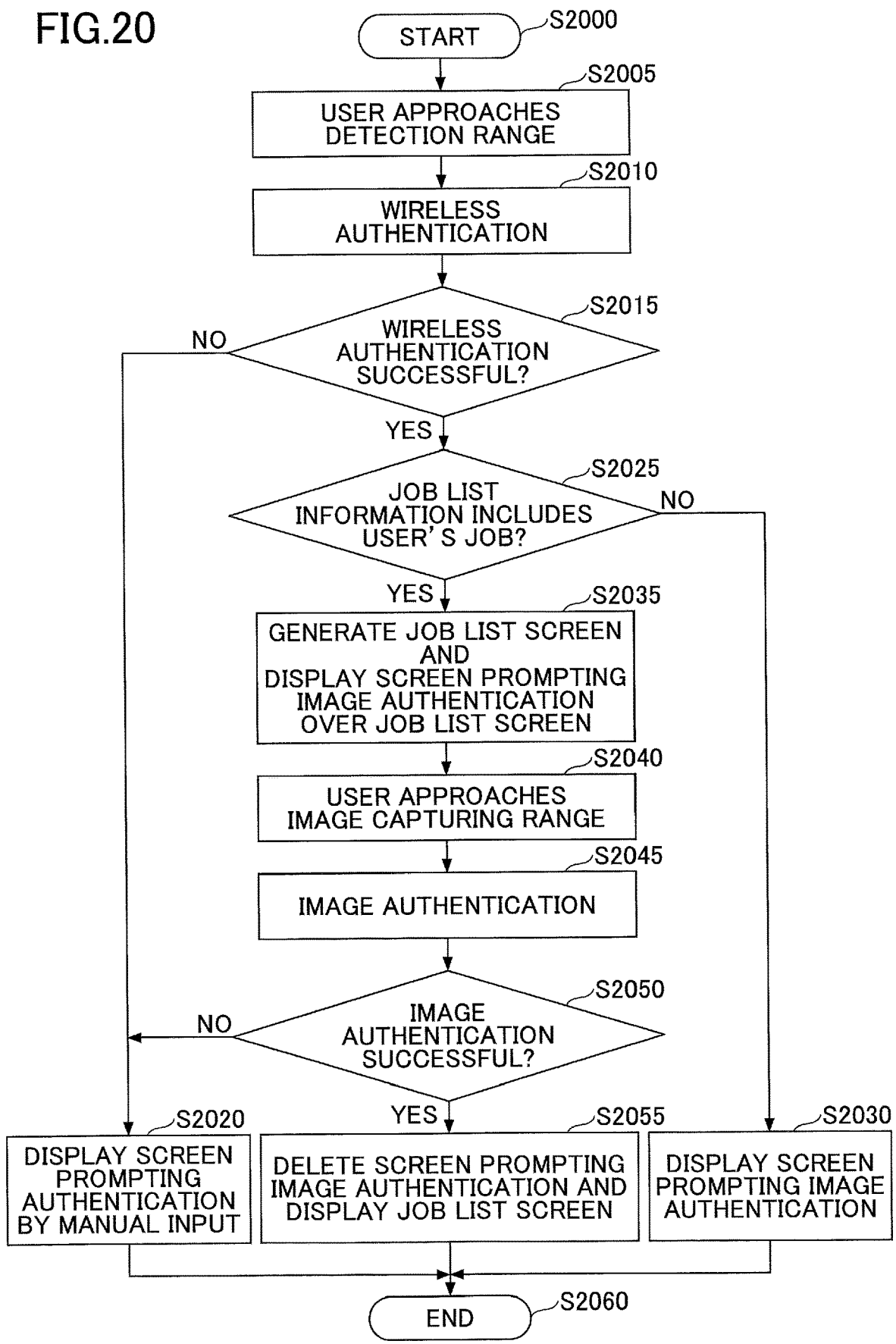
FIG. 20 is a flowchart illustrating the first example process flow from wireless authentication to screen activation after user login.

FIG. 20 is a flowchart summarizing the processes of FIG. 18 and FIG. 19. That is, the process of FIG. 20 is started in step S2000, and in step S2005, the user approaches the detection range of the MFP 10 where the IC card carried by the user can be detected. In step S2010, the wireless authentication process is performed when the user enters the detection range. In step S2015, it is determined whether the wireless authentication has been successful. If the wireless authentication has failed, the process proceeds to step S2030. If the wireless authentication has been successful, the process proceeds to step S2035.

In step S2030, a screen prompting image authentication is displayed. In step S2035, a job list screen is generated, a screen prompting image authentication is arranged thereon, and the screen prompting image authentication is displayed. In step S2040, the user approaches the image capturing range where the camera of the MFP 10 can capture an image including the face of the user. In step S2045, an image is captured when the user enters the image capturing range, facial feature information is extracted from the image, and the image authentication process is performed.

In step S2050, it is determined whether the image authentication has been successful. If the image authentication results in authentication failure, the process proceeds to step S2020. If the image authentication has been successful, the process proceeds to step S2055. In step S2055, the screen prompting image authentication displayed on top of the job list screen is deleted, and the job list screen that has been hidden underneath is displayed. After a screen is displayed in step S2020, step S2030, or step S2055, the process proceeds to step S2060 at which the process is ended.

FIG. 21 is a diagram illustrating an example job list screen that is displayed after user login. The job list screen includes the information items included in the job list information stored in the server 11 or the storage unit 77a of the main unit 20 other than the address book number. That is, the job list screen displays includes the job ID, the job status, the user name, the document name, the number of pages, and the number of copies as information items and displays job information of all jobs or a part of the jobs that have been submitted (requested) for execution in the form of a list arranged in the order in which the jobs have been submitted.

The job list screen displays three buttons in addition to job information of all or a part of the jobs. The three buttons include a delete button for deleting a job, a withhold button for withholding execution of a job, and a rearrange button for rearranging the execution order of the jobs. Note that although three buttons are provided in the present example, the present invention is not limited thereto, and one, two, or four or more buttons may be provided, for example.

As illustrated in FIG. 21, the job list screen may be displayed such that only job information of a job associated with the user that has logged in can be viewed, for example. That is, job information of jobs submitted by other users may be masked (displayed such that specific content of the job information cannot be discerned). However, this is merely an illustrative example, and in other examples the job information of all jobs submitted by all users may be visibly displayed.

Figure 22:
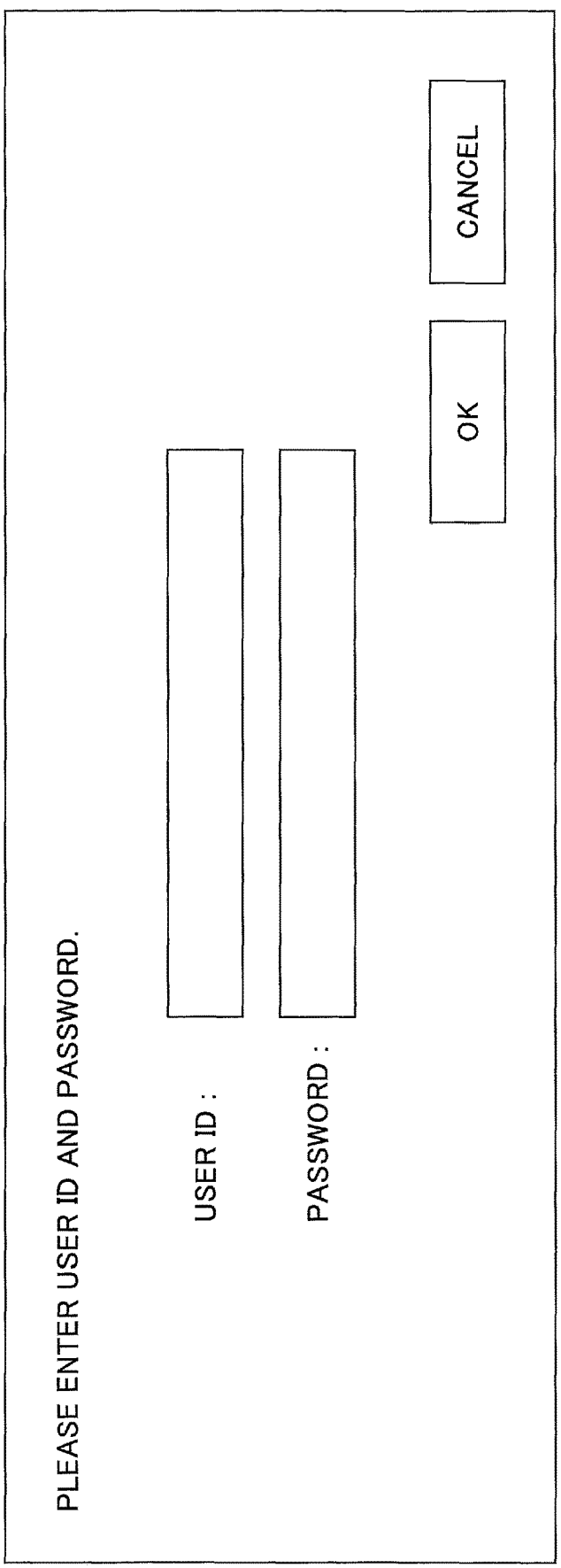
FIG. 22 is a diagram illustrating an example screen prompting authentication by manual input.

FIG. 22 is a diagram illustrating an example of a screen prompting authentication by manual input. The screen of FIG. 22 prompts a user to enter a user ID and a password. The user ID and the password may be numerals, characters, symbols, or any combination thereof, and the number of digits and/or the number of characters may be any number, for example.

FIG. 23 is a diagram illustrating an example of a screen prompting image authentication. The screen of FIG. 23 displays a message indicating that image authentication will be performed and prompting the user to be in front of the camera so that an image including the face of the user can be captured.

The MFP 10 performs wireless authentication every time a user carrying an IC card passes the detection range where the IC card can be detected. However, a job will not be executed by the MFP 10 unless the user that has requested execution of the job is successfully authenticated by image authentication. Thus, jobs may continue to be accumulated until the user is successfully authenticated by image authentication. Jobs are executed in the order in which they are requested, and as such, if the user is not authenticated, the requested job may remain unexecuted.

In order to prevent such accumulation of jobs, when image authentication is not executed within a certain time period after wireless authentication is successfully performed, the job of the user associated with the wireless tag ID used in the wireless authentication may be deleted, for example. The certain time period may be set to 30 seconds, for example.

Figure 24:
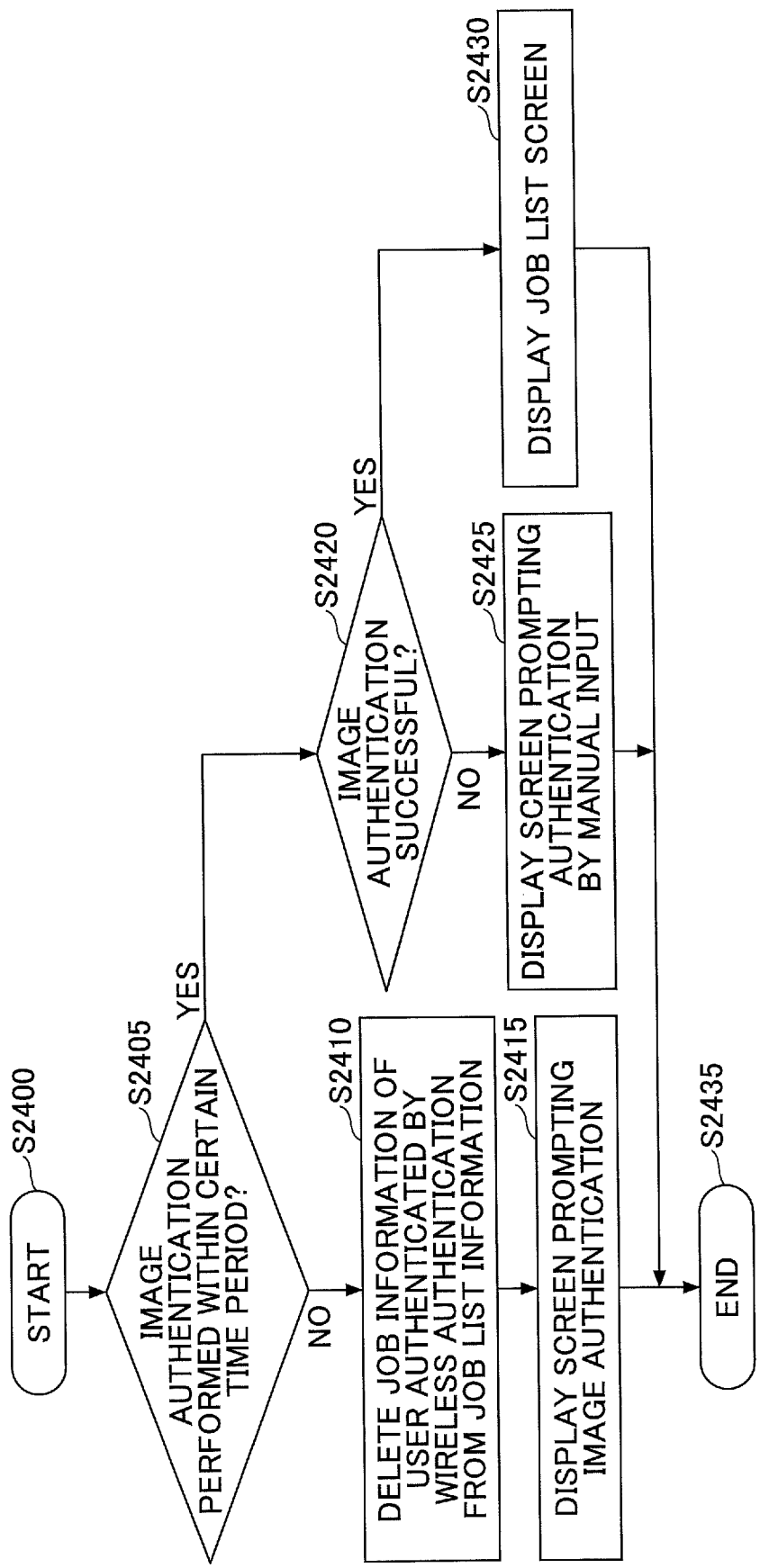
FIG. 24 is a flowchart illustrating an example process flow of a job deletion process.

FIG. 24 is a flowchart illustrating an example process of deleting a job when image authentication is not performed within a certain time period. The process of FIG. 24 is started in step S2400 after the wireless authentication successfully performed in step S2015 of FIG. 20. In step S2405, it is determined whether image authentication has been executed within a certain time period. More specifically, in step S2405, the processes of determining whether there is a job that has been requested by the user authenticated by wireless authentication and generating a job list screen are also executed. If image authentication is not executed within the certain time period (NO in step S2405), the process proceeds to step S2410 where job information of the job of the user that has been successful authenticated by wireless authentication is deleted from the job list information and the job list information updated. If a job list screen is generated, the generated job list screen is also discarded.

In step S2415, because no job of the user is included in the job list information, a screen prompting image authentication is displayed, and the process is ended in step S2435.

If image authentication has been performed within the certain time period (YES in step S2405), the process proceeds to step S2420 where it is determined whether image authentication has been successful. If the image authentication has resulted in authentication failure, the process proceeds to step 2425, and if the image authentication has been successful, the process proceeds to step S2430. In step S2425, a screen prompting authentication by manual input is displayed. In step S2430, a job list screen is displayed. Upon displaying one of the screens, the process proceeds to step S2435 at which the process is ended.

As described above with reference to FIG. 18, when a job requested by the user authenticated by wireless authentication does not exist, a screen prompting image authentication may be displayed, for example. However, when no print job is requested by the user, there is a high possibility that the user wishes to user other functions of the MFP 10, for example. As such, in another example, a home screen enabling selection of the other functions of the MFP 10 may be displayed. A user that attempts to use the MFP 10 without having requested (submitted) a print job in advance is likely to use a function other than a printing function, such as a scanning function or a copying function. Thus, a home screen displaying buttons (icons) for using a scanning function, a copying function, and the like may desirably be displayed, for example.

Figure 25:
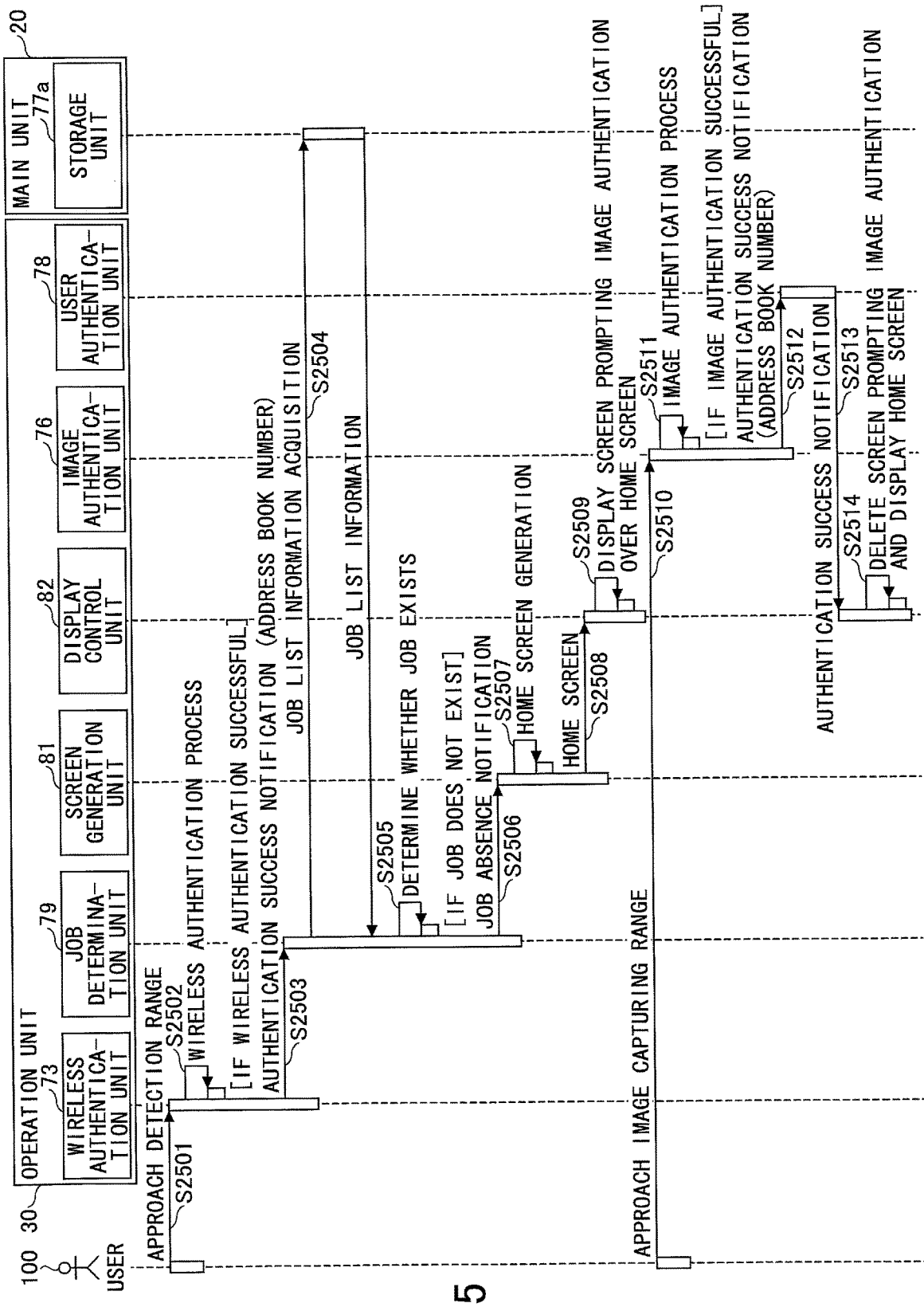
FIG. 25 is a sequence chart illustrating a second example process flow from wireless authentication to screen activation after user login.

FIG. 25 is a sequence chart illustrating another example process flow starting from wireless authentication to the activation of a screen after a user is logged in. In FIG. 25, the user 100 carrying an IC card approaches the detection range where the MFP 10 can detect the IC card (step S2501). When a wireless tag ID is acquired from the IC card as a result of the user entering the detection range, the wireless authentication unit 73 performs a wireless authentication process (step S2502).

The wireless authentication process by the wireless authentication unit 73 may result in authentication success or authentication failure. When the wireless authentication is not successful, subsequent process steps are not performed. As such, the case where the wireless authentication is successful is described below. The wireless authentication unit 73 notifies the job determination unit 79 that the authentication has been successful together with the address book number (step S2503). At this time, the wireless authentication unit 73 also notifies the user authentication unit 78 that the authentication has been successful together with the address book number. The job determination unit 79 sends a job list information acquisition request to the main unit 20 to acquire job list information (step S2504).

The job determination unit 79 then determines whether a job with a matching address book number matching that received from wireless authentication unit 73 is included in the job list information acquired from the main unit 20 (step S2505). A job with a matching address book number corresponds to a job requested by the user that has been authenticated by the wireless authentication.

If it is determined that a job requested by the user that has been authenticated by the wireless authentication exists, the job determination unit 79 notifies the screen generation unit 81 of the existence of the job together with the acquired job list information. Note that processes executed in this case may be substantially the same as those of the example process flow illustrated in FIG. 19 (see steps S1906-S1909). In the present example, a case where it is determined that a job requested by the user does not exist will be described. The job determination unit 79 notifies the screen generation unit 81 that there is no job requested by the user (step S2506).

In turn, the screen generation unit 81 generates a predetermined screen to be displayed on the operation panel 37 after the user is logged in (step S2507). The predetermined screen to be generated may be a home screen, for example. The home screen is a basic screen relating to all operations of the MFP 10 and has display components, such as icons, representing applications for executing the functions installed in the MFP 10 arranged thereon. Upon generating the home screen, the screen generation unit 81 transmits the generated home screen to the display control unit 82 (step S2508).

The display control unit 82 arranges the received home screen underneath a screen prompting image authentication so that the home screen cannot be seen by the user, and displays the screen prompting image authentication (step S2509).

The user 100 further approaches the MFP 10 to enter the image capturing range where an image including the face of the user can be captured (step S2510). When an image is acquired as a result of the user 100 entering the image capturing range and the facial feature information is extracted from the acquired image, the image authentication unit 76 performs an image authentication process (step S2511). When the image authentication is not successful, subsequent process steps are not performed. As such, the case where the image authentication is successful is described below. The image authentication unit 76 notifies the user authentication unit 78 that the image authentication has been successful together with the address book number (step S2512).

The user authentication unit 78 compares the address book numbers acquire from the wireless authentication unit 73 and the address book number acquired from the image authentication unit 76, and if they match, the user authentication unit 78 allows the user to use the MFP 10 and login. After the user is logged in, the user authenticating unit 78 notifies the display control unit 82 that the user has logged in (step S2513).

In the case where the job determination unit 79 determined that there is no job requested by the user authenticated by wireless authentication, the display control unit 82 deletes the screen prompting image authentication arranged on top of the home screen after the user is logged in and displays the home screen (step S2514).

Figure 26:
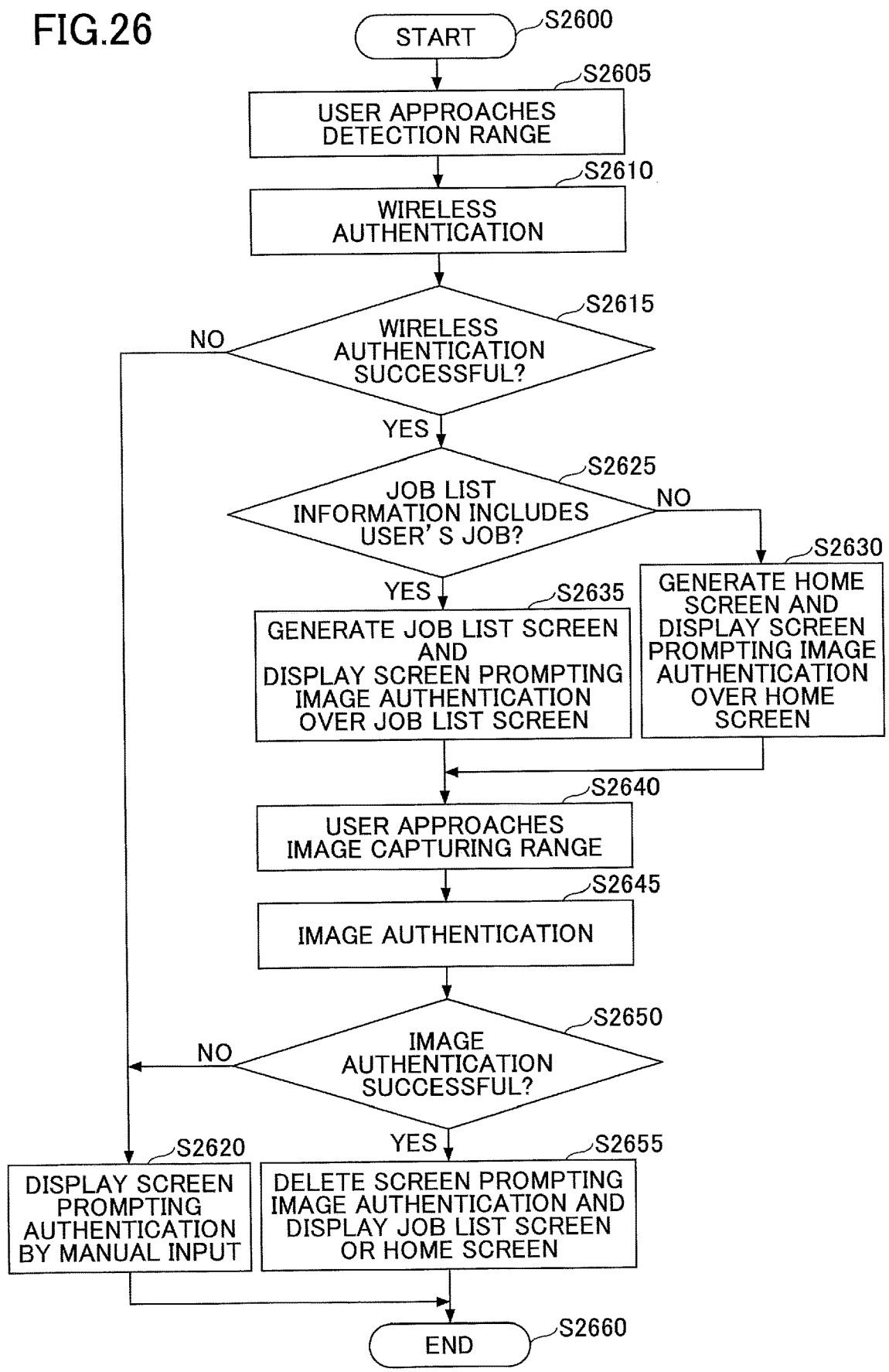
FIG. 26 is a flowchart illustrating the second example process flow from wireless authentication to screen activation after user login.

FIG. 26 is a flowchart summarizing the processes of FIGS. 19 and 25. That is, the process of FIG. 26 starts from step S2600 and in step S2605, the user 100 approaches the detection range of the MFP 10 where an IC card carried by the user 100 can be detected. In step S2610, a wireless authentication process is performed when the user enters the detection range. In step S2615, it is determined whether the wireless authentication has been successful. If the wireless authentication is not successful, the process proceeds to step S2620, and if the wireless authentication is successful, the process proceeds to step S2625.

In step S2620, a screen prompting authentication by manual input is displayed. In step S2625, it is determined whether there is a job requested by the user in the job list information. If such a job does not exist, the process proceeds to step S2630, and if such a job exists, the process proceeds to step S2635.

In step S2630, a home screen is generated, a screen prompting image authentication is arranged thereon, and the screen prompting image authentication is displayed. In step S2635, a job list screen is generated, a screen prompting image authentication is arranged thereon, and the screen prompting image authentication is displayed. In step S2640, the user 100 approaches the image capturing range where an image including the face of the user 100 can be captured. In step S2645, an image of the user is captured when the user enters the image capturing range, facial feature information is extracted from the acquired image, and an image authentication process is executed.

In step S2650, it is determined whether the image authentication has been successful. If the image authentication is not successful, the process proceeds to step S2620, and if the image authentication is successful, the process proceeds to step S2655. In step S2655, the screen prompting image authentication is deleted, and the home screen or the job list screen is displayed. Upon displaying any one of these screens, the process proceeds to step S2660 at which the process is ended.

In step S2655, if a job requested by the user does not exist, the home screen is displayed, and if such a job exists, the job list screen is displayed. When there is no job requested by the user, there is a relatively high possibility that the user intends to use functions other than the printing function. Because the user may not know the functions that are available, a home screen enabling the user to select a function from the available functions and execute the selected function is displayed in this case. On the other hand, when there is a job requested by the user, the job list screen is displayed so that the user can check the execution status of the job, for example.

Figure 27:
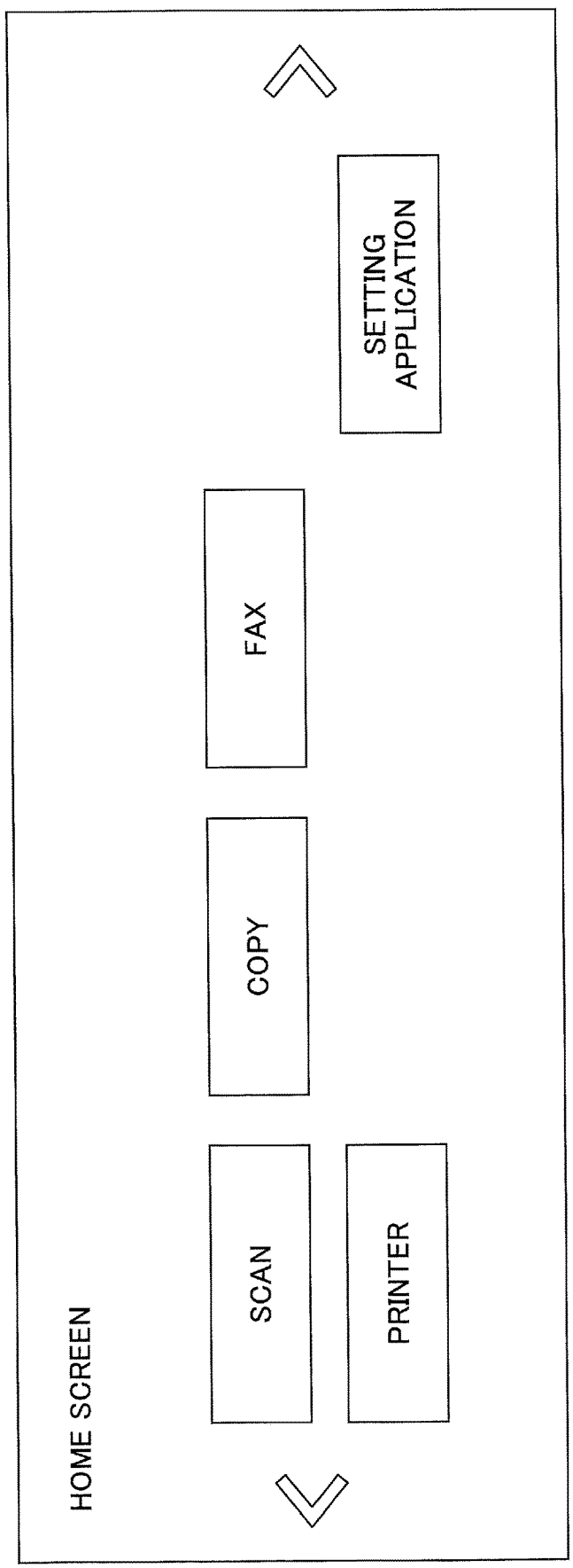
FIG. 27 is a diagram illustrating an example home screen.

FIG. 27 is a diagram illustrating an example of the home screen that may be displayed in step S2655. In FIG. 27, the home screen includes icons for activating a scan application, a copy application, a fax transmission/reception application, a print application, and various setting applications. The home screen may also include icons for activating various SDK (Software Development Kit) applications, various URL (Uniform Resource Locator) links, and other programs, for example. Note that an SDK refers to a set of programs for developing software for the MFP 10.

Note that when the number of icons to be displayed on the home screen increases, the icons may not fit within one screen. In such case, the home screen may be made up of a plurality of screens including icons and arrows, for example. By touching an icon included in one screen of the home screen displayed on the operation panel 37, the user may activate a corresponding function, and by touching an arrow included in the screen, the user can cause the display of the home screen to transition to a previous screen or a next screen, for example.

Also, in some embodiments, instead of displaying a job list screen as described above, a home screen including icons representing a scan application, a copy application, a fax transmission/reception application, a print application, and the like may be displayed as a pull print screen. Pull printing is a printing function that allows a user to accumulate jobs on a server and print using a given device after logging in.

Note that in the example process flow of FIG. 19, the job determination unit 79 acquires job list information from the storage unit 77a via the communication unit 80a of the main unit 20 and determines whether job information associated with the address book number acquired from the wireless authentication unit 73 is included in the acquired job list information. However, when the job list information is acquired from the storage unit 77a of the main unit 20 at the time wireless authentication is performed, and image authentication is performed after a certain time period elapses from the time of wireless authentication, the job list information may have been updated in the server 11. In such case a job list screen indicating the latest job list information cannot be displayed. Accordingly, in a preferred embodiment, the server 11 is accessed as necessary to acquire the latest job list information, and information displayed on the job list screen that has been generated is updated based on the acquired latest job list information.

Figure 28:
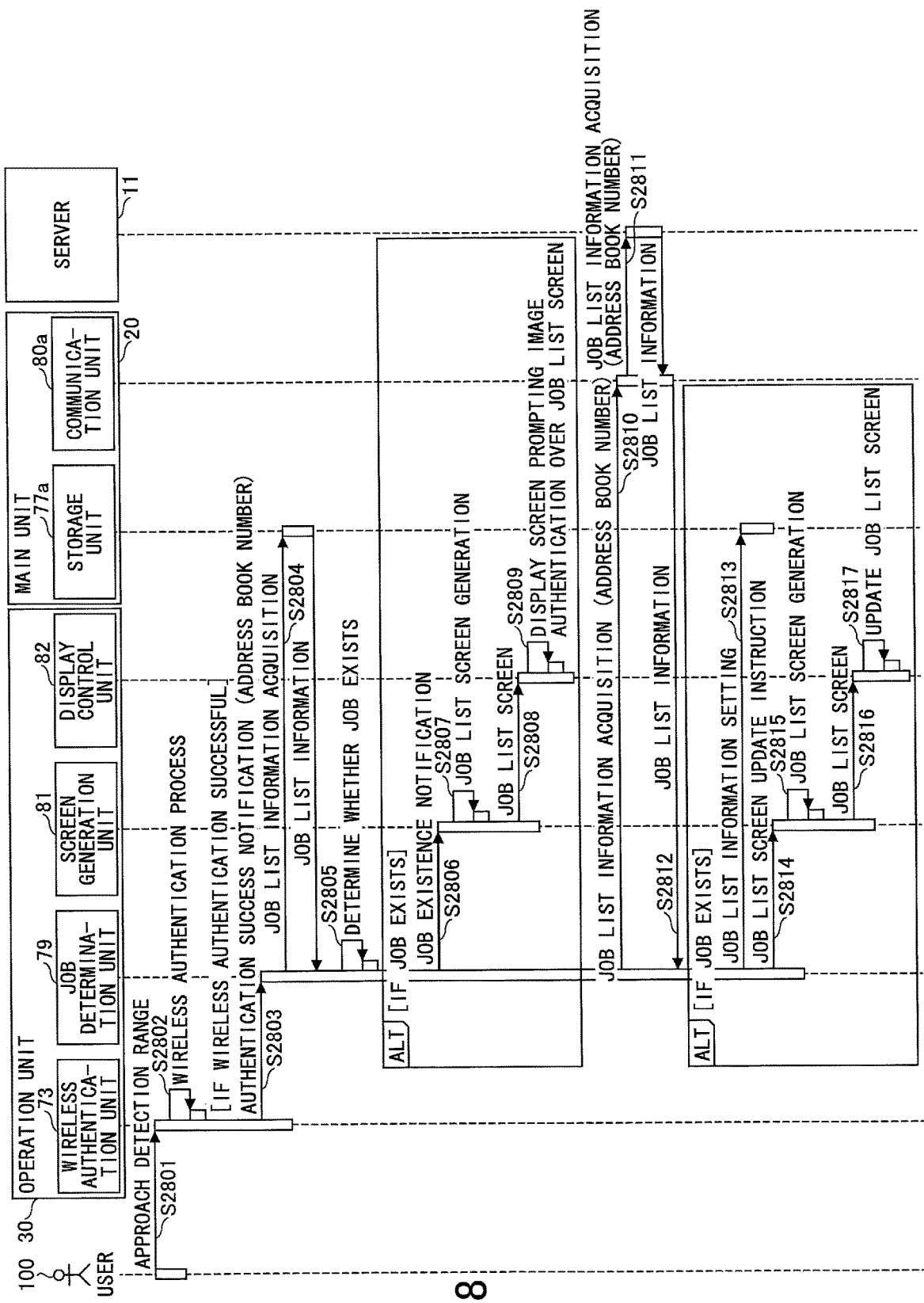
FIG. 28 is a sequence chart illustrating a process of acquiring the latest job list information from a server and updating the job list screen.

FIG. 28 is a sequence chart illustrating an example process of acquiring the latest job list information from the server 11 and updating the job list screen. In FIG. 28, the user 100 carrying an IC card approaches the detection range where the MFP 10 can detect the IC card (step S2801). When a wireless tag ID is acquired from the IC card as a result of the user 100 entering the detection range, the wireless authentication unit 73 performs a wireless authentication process (step S2802).

The wireless authentication process by the wireless authentication unit 73 may result in authentication success or authentication failure. If the wireless authentication is not successful, subsequent process steps are not performed. As such, the case where the wireless authentication is successful is described below. The wireless authentication unit 73 notifies the job determination unit 79 that the wireless authentication has been successful together with the address book number (step S2803). The job determination unit 79 acquires job list information from the storage unit 77a via the communication units 80a and 80b (step S2804).

The job determination unit 79 determines whether a job with a matching address book number matching the address book number received from the wireless authentication unit 73 is included in the acquired job list information (step S2805). Because a wireless tag ID is acquired in the wireless authentication process of step S2802, the address book number associated with the acquired wireless tag ID is used as a reference to determine whether job information including the same address book number exists in the acquired job list information.

If a job with a matching address book number is found, the job determination unit 79 notifies the screen generation unit 81 of the existence of the job together with the acquired job list information (step S2806). The screen generation unit 81 uses the job list information to generate a screen to be displayed on the operation panel 37 after the user logs in (step S2807). The generated screen is a job list screen. The screen generation unit 81 transmits the generated screen to the display control unit 82 so that the screen can be displayed after image authentication is completed and the user is logged in (step S2808).

The display control unit 82 arranges the generated screen underneath a screen prompting image authentication so that the generated screen cannot be seen by the user, and displays the screen prompting image authentication (step S2809).

In order to acquire the latest job list information held by the server 11, the job determination unit 79 requests the communication unit 80a of the main unit 20 to acquire the latest job list information held by the server 11 (step S2810). Note that communication with the communication unit 80a is established via the communication unit 80b. Upon receiving the job list information request, the communication unit 80a acquires the job list information from the server 11 (step S2811). The communication unit 80*a* transmits the acquired job list information to the job determination unit 79 via the communication unit 80*b* (step S2812).

The job determination unit 79 compares the received job list information with the job list information acquired from the storage unit 77*a*, and determines whether the received job list information includes changes. If changes are included, the job determination unit 79 stores the received job list information in the storage unit 77*a* and updates the job list information (step S2813).

Also, the job determination unit 79 instructs the screen generation unit 81 to update the content of the job list screen (step S2814). Upon receiving the instruction, the screen generation unit 81 newly generates a job list screen to be arranged underneath the screen prompting image authentication (step S2815). The screen generation unit 81 then transmits the newly generated job list screen to the display control unit 82 (step S2816).

The display control unit 82 updates the job list screen by replacing the original job list screen with the received new job list screen (step S2817). Note that although a process of newly generating and replacing the job list screen is described above as an example process for updating the job list screen, the present invention is not limited thereto. In another example, the job list screen underneath the screen prompting image authentication may be extracted, changed portions of the screen may be corrected, and the corrected job list screen may be arranged underneath the screen prompting image authentication. The process of accessing the server 11 to acquire the latest job list information may be performed at predetermined time intervals, such as every 2 seconds, for example.

Note that subsequent process steps of FIG. 28 may be substantially identical to steps S1910 to S1914 of FIG. 19. That is, the user 100 further approaches the image capturing range of the MFP 10 where an image including the face of the user 100 can be captured. When an image is acquired as a result of the user 100 entering the image capturing range and facial feature information is extracted from the acquired image, the image authentication unit 76 performs an image authentication process. Then, the user authentication unit 78 compares the address book number acquired from the wireless authentication unit 73 and the address book number acquired from the image authentication unit 76, and if they match, the user authentication unit 78 allows the user to use the MFP 10 and login. The display control unit 82 deletes the screen prompting image authentication screen and displays the job list screen arranged thereunder.

Figure 29:
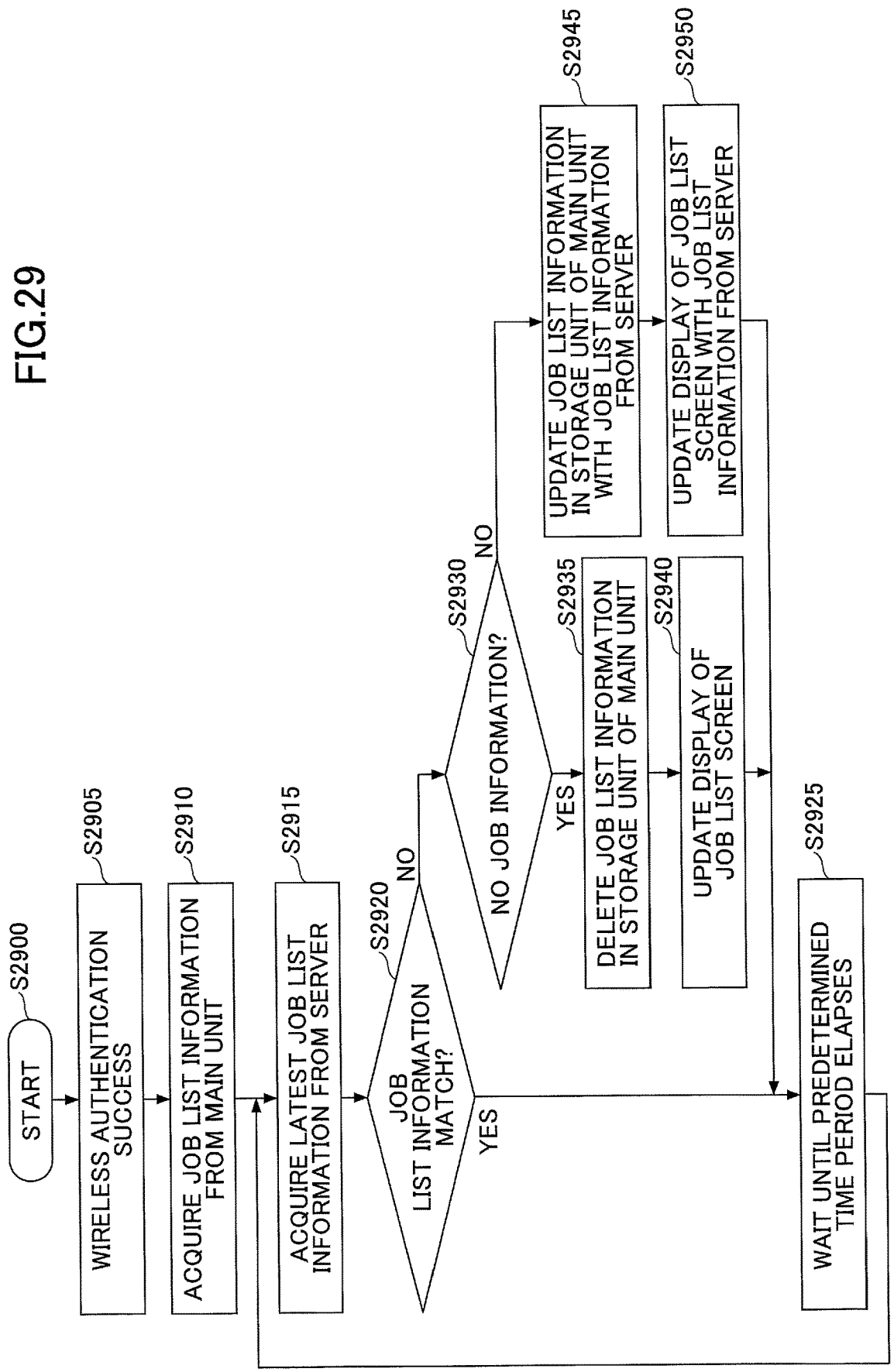
FIG. 29 is a flowchart illustrating the process of acquiring the latest job list information from the server and updating the job list screen.

FIG. 29 is a flowchart summarizing the process of FIG. 28 for acquiring the latest job list information from the server 11. That is, the process of FIG. 29 starts from step S2900, and the wireless authentication process is successfully performed in step S2905. In step S2910, job list information is acquired from the main unit 20.

In step S2915, the latest job list information is acquired from the server 11. In step S2920, the job list information acquired from the main unit 20 is compared with the job list information acquired from the server 11 to determine whether they match. If they match, the process proceeds to step S2925 and waits until a predetermined time period elapses. After the predetermined time period has elapsed, the process returns to step S2915, and the latest job list information is acquired from the server 11 again.

If it is determined in step S2920 that the job list information acquired from the main unit 20 and the job list information acquired from the server 11 do not match, the process proceeds to step S2930. In step S2930, it is determined whether all the jobs in the job list information have been executed such that no job information is included in the latest job list information. If no job information is included, the process proceeds to step S2935 where the job list information stored in the storage unit 77*a* of the main unit 20 is deleted, and in step S2940, the job list screen is updated.

If the job list information acquired from the main unit 20 and the job list information acquired from the server 11 do not match but job information is included in the latest job list information, this means that the number of jobs has increased or decreased, and the process proceeds to step S2945 where the job list information stored in the storage unit 77*a* is updated to the latest job list information acquired from the server 11. Then, in step S2950, the job list screen is updated. Thereafter, the process proceeds to step S2925 wait for the predetermined time period to elapse. After the predetermined time period has elapsed, the process returns to step S2915 and the latest job list information is acquired from the server 11 again.

FIGS. 30A-30D are diagrams illustrating example job list screens. FIG. 30A illustrates an example job list screen generated using the job list information acquired from the storage unit 77*a*, and FIGS. 30B-30D illustrate example job list screens updated with the latest job list information acquired from the server 11. In the job list screen of FIG. 30A, job information of two jobs is displayed.

FIG. 30B illustrates an example job list screen displayed in a case where execution of one of the jobs listed in the job list screen of FIG. 30A has been completed such that one job is reduced. On the other hand, FIG. 30C illustrates an example job list screen displayed in a case where the user requests execution of one more job such that jobs listed in the job list screen is increased. FIG. 30D illustrates an example job list screen when execution of the two jobs listed in the job list screen of FIG. 30A has been completed such that there are no jobs to be executed.

As described above, according to an aspect of the present invention, when a job requested by a user does not exist, a home screen for enabling the user to select a desired function may be displayed after the user is allowed to use the MFP 10, for example. In this way, the user can select a desired function to be used and activate the selected function. According to another aspect of the present invention, a job list screen to be displayed on the operation panel 37 at the time the user logs in can be kept up to date to display the latest job list information such that the user can obtain the latest information relating to jobs.

Although the present invention has been described above with reference to certain illustrative embodiments, the present invention is not limited to these embodiments, and numerous variations and modifications may be made without departing from the scope of the present invention.

The present invention can be implemented in any convenient form, for example, using dedicated hardware, or a mixture of dedicated hardware and software. The present invention may be implemented as computer software implemented by one or more networked processing apparatuses. The network can comprise any conventional terrestrial or wireless communications network, such as the Internet. Since the present invention can be implemented as software, each and every aspect of the present invention thus encompasses computer software implementable on a programmable device. The computer software can be provided to the programmable device using any non-transitory storage medium for storing processor readable code, such as a floppy disk, a hard disk, a CD (compact disk), a CD ROM (read-only memory), a DVD (digital versatile disk), an SD memory card, or a USB (universal serial bus) memory, for example. The non-transitory storage medium can comprise any computer-readable medium except for a transitory, propagating signal.

The hardware platform includes any desired hardware resources including, for example, a central processing unit (CPU), a random access memory (RAM), and a hard disk drive (HDD). The CPU may include processors of any desired type and number. The RAM may include any desired volatile or nonvolatile memory. The HDD may include any desired nonvolatile memory capable of recording a large amount of data. The hardware resources may further include an input device, an output device, and a network device in accordance with the type of the apparatus. The HDD may be provided external to the apparatus as long as the HDD is accessible from the apparatus. In this case, the CPU (e.g., cache memory of the CPU) and the RAM may operate as a physical memory or a primary memory of the apparatus, while the HDD may operate as a secondary memory of the apparatus.

Note that the above-described functional units according to embodiments of the present invention may be implemented by the CPU loading a program stored in the HDD into the RAM and executing the program, for example. Also, at least a part the functional units may be implemented by a dedicated hardware circuit (e.g., a semiconductor integrated circuit), for example.

What is claimed is:

1. An information processing apparatus comprising:
   a memory storing a program; and
   a processor configured to execute the program to implement a process of:
      acquiring job list information;
      executing a first authentication process with respect to a user;
      after the first authentication process successfully authenticates the user, determining that the acquired job list information includes job information corresponding to the authenticated user, and generating a screen based on the job information corresponding to the authenticated user in response to determining that the acquired job list information includes the job information corresponding to the authenticated user;
      executing another authentication process with respect to the user; and
      after the another authentication process successfully authenticates the user, determining that the acquired job list information does not include job information corresponding to the authenticated user, and displaying a home screen in response to determining that the acquired job list information does not include the job information corresponding to the authenticated user.

2. The information processing apparatus according to claim 1, wherein
   the processor executes the first authentication process using first authentication information of the user, a second authentication process using second authentication information of the user, and a third authentication process using first authenticated user information of the user that has been authenticated by the first authentication process and second authenticated user information of the user that has been authenticated by the second authentication process.

3. The information processing apparatus according to claim 2, further comprising:
   a wireless communication device configured to establish wireless communication with a communication device that is carried by the user and acquire device identification information identifying the communication device from the communication device; and
   an image capturing device configured to capture an image of the user;
   wherein the processor executes the first authentication process using the device identification information acquired by the wireless authentication device as the first authentication information; and
   wherein the processor executes the second authentication process using feature information that is obtained from the image of the user captured by the image capturing device as the second authentication information.

4. The information processing apparatus according to claim 3, further comprising:
   an operation unit configured to accept an operation from the user; and
   a main unit configured to execute jobs corresponding to the job list information upon request from the operation unit;
   wherein the operation unit includes the processor and a first storage unit that stores a portion of user information of a plurality of users; and
   wherein the main unit includes a second storage unit that stores a remaining portion of the user information of the plurality of users that is not stored in the first storage unit.

5. The information processing apparatus according to claim 4, wherein
   the processor executes the first authentication process based on the first authentication information acquired by the wireless communication device and the portion of the user information stored in the first storage unit; and
   the processor executes the first authentication process based on the first authentication information and the remaining portion of the user information stored in the second storage unit when the first authentication process executed based on the first authentication information and the portion of the user information stored in the first storage unit is not successful.

6. The information processing apparatus according to claim 4, wherein
   the processor executes the second authentication process based on the second authentication information obtained from the image captured by the image capturing device and the portion of the user information stored in the first storage unit; and
   the processor executes the second authentication process based on the second authentication information and the remaining portion of the user information stored in the second storage unit when the second authentication process executed based on the second authentication information and the portion of the user information stored in the first storage unit is not successful.

7. The information processing apparatus according to claim 2, wherein
   after the user is successfully authenticated by the first authentication process, the processor controls the display unit to display a screen prompting the second authentication process based on the second authentication information on top of the screen generated based on the information corresponding to the user.

8. The information processing apparatus according to claim 7, wherein when the user is successfully authenticated by the second authentication process, the processor controls the display unit to delete the screen prompting the second authentication process and display the screen generated based on the job information corresponding to the user.

9. The information processing apparatus according to claim 1, wherein
the home screen is a screen enabling selection of a function to be executed from a plurality of functions of the information processing apparatus.

10. The information processing apparatus according to claim 1, wherein
the processor further implements processes of establishing communication with an external device that stores the job list, and acquiring the execution request job list from the external device.

11. The information processing apparatus according to claim 1, corresponding to an image processing apparatus, comprising:
a main unit including a first operating system, an image forming application for operating at least one of a printer and a scanner, and a storage unit storing address book information; and
an operation unit including a second operating system and an input unit for enabling the user to input an operation instruction directed to the main unit;
wherein the operation unit further includes a wireless authentication application including a wireless authentication unit configured to execute the first authentication process, a face authentication application including an image authentication unit configured to execute a second authentication process, a screen generation unit configured to generate the screen based on the job information corresponding to the user, and a pull print application configured to acquire the job information from an external server and submit the job to the image forming application of the main unit; and
wherein the wireless authentication application, the face authentication application, and the pull print application are run on the second operating system of the operation unit.

12. The information processing apparatus according to claim 11, wherein
when image authentication by the image authentication unit is not successfully performed at the time the pull print application acquires the job information from the external server, a screen prompting image authentication is displayed on top of the screen generated by the screen generation unit.

13. The information processing apparatus according to claim 1,
wherein the job information is information indicating a job previously submitted for execution by the user.

14. The information processing apparatus according to claim 1,
wherein the processor executes the first authentication process using a wireless communication device;
wherein the processor determines that the acquired job list information includes the job information corresponding to the user;
wherein the processor executes a second authentication process using an image capturing device;
wherein the processor executes the process of generating the screen based on the job information corresponding to the user, after the processor executes the first authentication process and before the processor executes the second authentication process.

15. The information processing apparatus according to claim 1,
wherein the information processing apparatus further comprises:
a wireless authentication unit; and
a face authentication unit that obtains authentication information at a distance that is closer to the information processing apparatus than the wireless authentication unit;
wherein, after the wireless authentication unit successfully authenticates a user, the information processing apparatus determines whether a print job of the user successfully authenticated by the wireless authentication unit exists, automatically displays a confirmed print job list screen after a successful face authentication of the user by the face authentication unit, in the case where it is determined that a print job of the user successfully authenticated by the wireless authentication unit exists, and displays a home screen after a successful face authentication of the user by the face authentication unit, in the case where it is determined that a print job of the user successfully authenticated by the wireless authentication unit does not exist.

16. An information processing system comprising:
a memory storing a program; and
a processor configured to execute the program to implement a process of:
acquiring job list information;
executing a first authentication process with respect to a user;
after the first authentication process successfully authenticates the user, determining that the acquired job list information includes information corresponding to the authenticated user, and generating a screen based on the job information corresponding to the authenticated user, in response to determining that the acquired job list information includes the job information corresponding to the authenticated user;
executing a second authentication process with respect to the user; and
after the second authentication process successfully authenticates the user, determining that the acquired job list information does not include job information corresponding to the authenticated user, and displaying a home screen in response to determining that the acquired job list information does not include the job information corresponding to the authenticated user.

17. An information processing method that is implemented by an information processing apparatus, the information processing method comprising:
acquiring job list information;
executing a first authentication process with respect to a user;
after the first authentication process successfully authenticates the user, determining that the acquired job list information includes information corresponding to the authenticated user, and generating a screen based on the job information corresponding to the authenticated user, in response to determining that the acquired job list information includes the job information corresponding to the authenticated user;
executing a second authentication process with respect to the user; and
after the second authentication process successfully authenticates the user, determining that the acquired job list information does not include job information corresponding to the authenticated user, and displaying a home screen in response to determining that the acquired job list information does not include the job information corresponding to the authenticated user.

18. A non-transitory computer-readable medium storing a program that, when executed, causes a computer to implement the information processing method according to claim 17.

* * * * *